United States Patent
Ito

(10) Patent No.: US 10,367,960 B2
(45) Date of Patent: Jul. 30, 2019

(54) IMAGE FORMING APPARATUS, ACTIVATION CONTROL METHOD AND NON-TRANSITORY COMPUTER-READABLE RECORDING MEDIUM ENCODED WITH ACTIVATION CONTROL PROGRAM

(71) Applicant: Konica Minolta, Inc., Tokyo (JP)

(72) Inventor: Hiroyasu Ito, Okazaki (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/426,519

(22) Filed: Feb. 7, 2017

(65) Prior Publication Data
US 2017/0244854 A1 Aug. 24, 2017

(30) Foreign Application Priority Data
Feb. 19, 2016 (JP) .................................. 2016-029797

(51) Int. Cl.
*H04N 1/00* (2006.01)
*H04N 1/32* (2006.01)
(Continued)

(52) U.S. Cl.
CPC ..... *H04N 1/00891* (2013.01); *H04N 1/00896* (2013.01); *H04N 1/00904* (2013.01);
(Continued)

(58) Field of Classification Search
None
See application file for complete search history.

(56) References Cited

U.S. PATENT DOCUMENTS

| 8,949,641 | B2 * | 2/2015 | Goda | .................... | G06F 9/461 |
| | | | | | 713/320 |
| 2009/0144573 | A1 * | 6/2009 | Ohhashi | ............. | G03G 15/5004 |
| | | | | | 713/323 |

(Continued)

FOREIGN PATENT DOCUMENTS

| JP | 2006-092474 | * | 4/2006 | ............... G06F 1/32 |
| JP | 2012-038179 | | 2/2012 | |

(Continued)

OTHER PUBLICATIONS

European Patent Application No. 17155368.8; Extended Search Report; dated Apr. 7, 2017; 4 pages.

(Continued)

*Primary Examiner* — Beniyam Menberu
(74) *Attorney, Agent, or Firm* — Baker Hostetler

(57) ABSTRACT

An image forming apparatus includes a main controller, a volatile first storage, a sub-controller, a non-volatile second storage, and an associator that associates one or more of a plurality of hardware resources with each of a plurality of activation factors, the main controller includes a mode switcher that switches an operation mode, the sub-controller includes a shut-off controller that shuts off power supply to the main controller, an activation factor detector that detects activation factor, a power recoverer that, in response to detection of activation factor, supplies power to the main controller, and an activator that, in response to detection of activation factors, activates the main controller, and the main controller includes a recoverer that reads out a snapshot from the second storage, and stores the snapshot in the first storage.

21 Claims, 14 Drawing Sheets

(51) Int. Cl.
 H04N 1/333 (2006.01)
 G06F 3/12 (2006.01)
 G06K 15/02 (2006.01)
(52) U.S. Cl.
 CPC ..... *H04N 1/00928* (2013.01); *H04N 1/32593* (2013.01); *H04N 1/333* (2013.01); *H04N 2201/0094* (2013.01)

(56) References Cited

U.S. PATENT DOCUMENTS

| | | |
|---|---|---|
| 2010/0238507 A1 | 9/2010 | Matsushima et al. |
| 2012/0008165 A1 | 1/2012 | Tanaka |
| 2013/0036319 A1 | 2/2013 | Tanaka |
| 2013/0258409 A1 | 10/2013 | Shintani |
| 2014/0101433 A1* | 4/2014 | Tanaka ................ G06F 1/3284 713/100 |
| 2015/0185680 A1 | 7/2015 | Takatani |
| 2016/0057304 A1* | 2/2016 | Yamaguchi ........ H04N 1/00904 358/1.14 |
| 2016/0182755 A1* | 6/2016 | Saito ................ H04N 1/00896 358/1.14 |

FOREIGN PATENT DOCUMENTS

| | | |
|---|---|---|
| JP | 2013-034072 | 2/2013 |
| JP | 2015-123650 | 7/2015 |

OTHER PUBLICATIONS

Office Action issued in JP Application No. 20170085822.8 dated Oct. 25, 2018.

* cited by examiner

F I G. 1
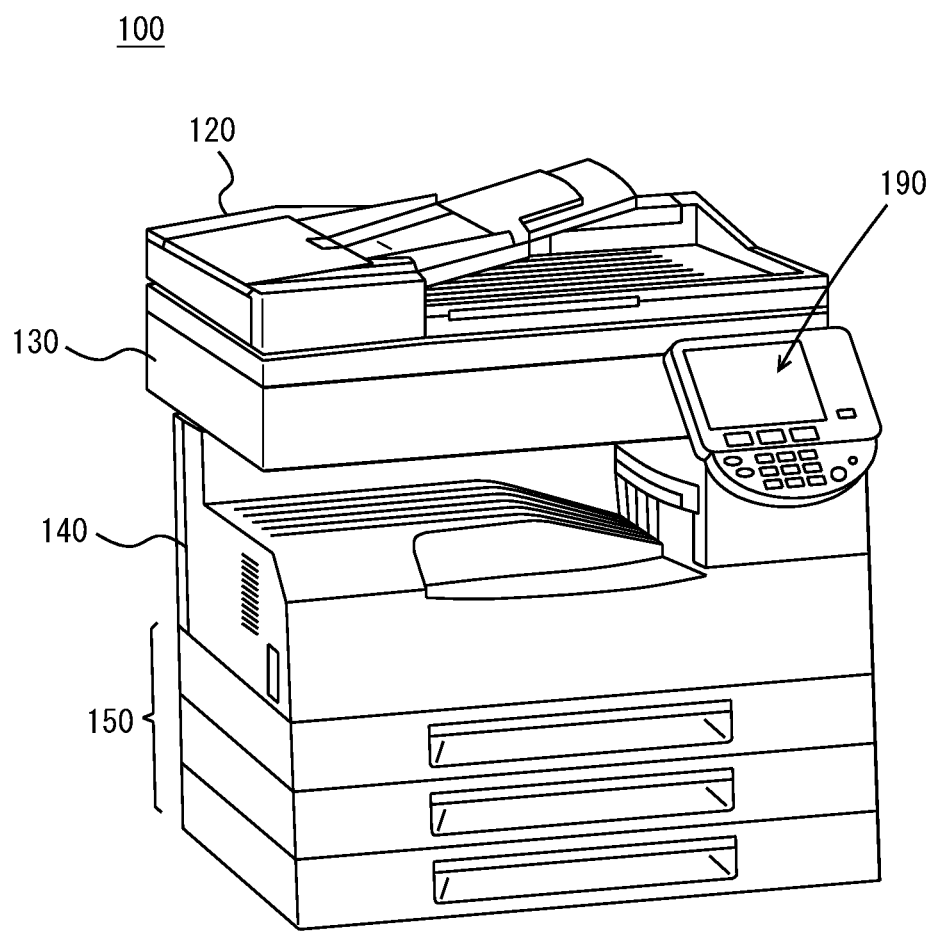

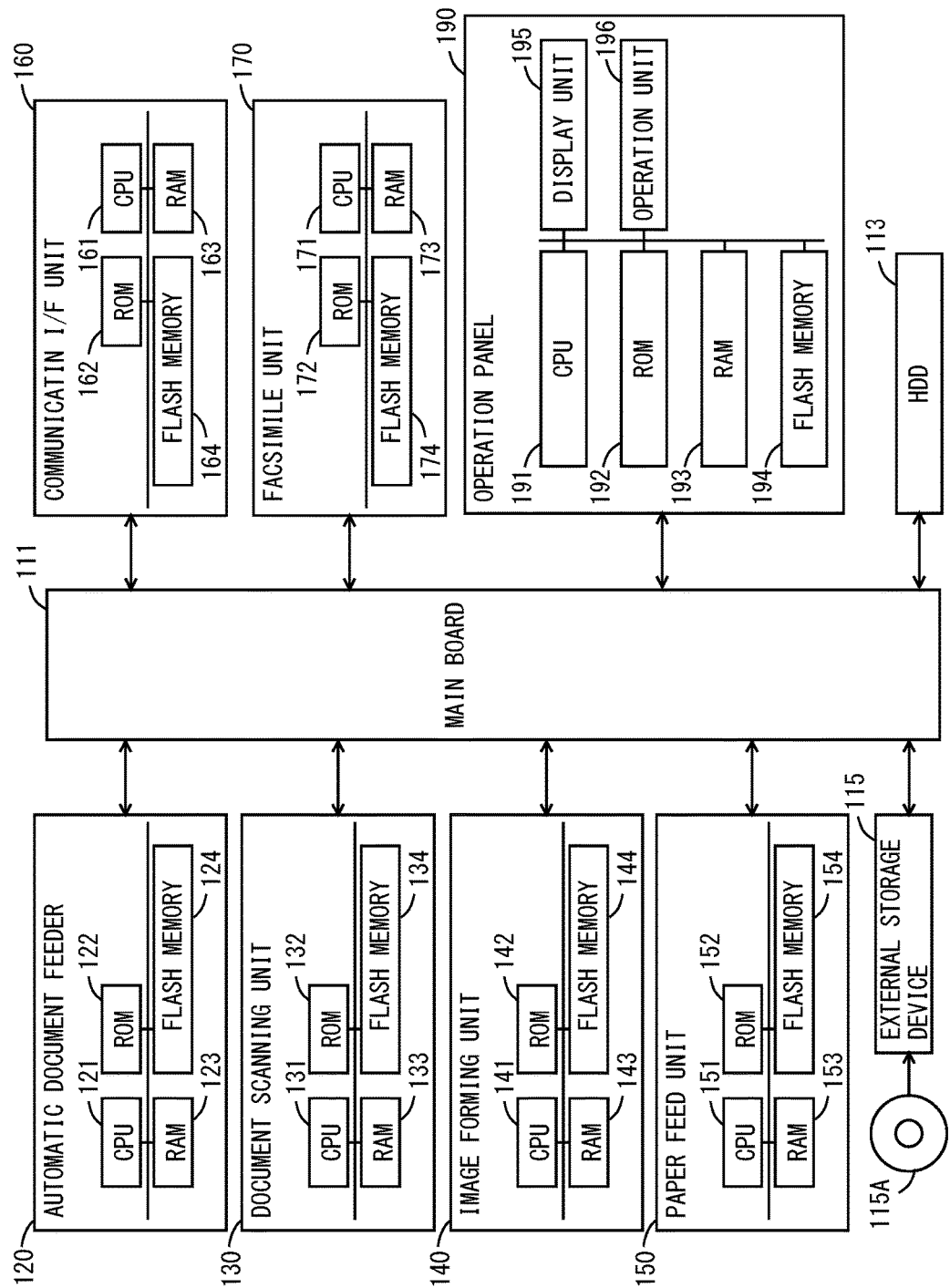
F I G. 2
100

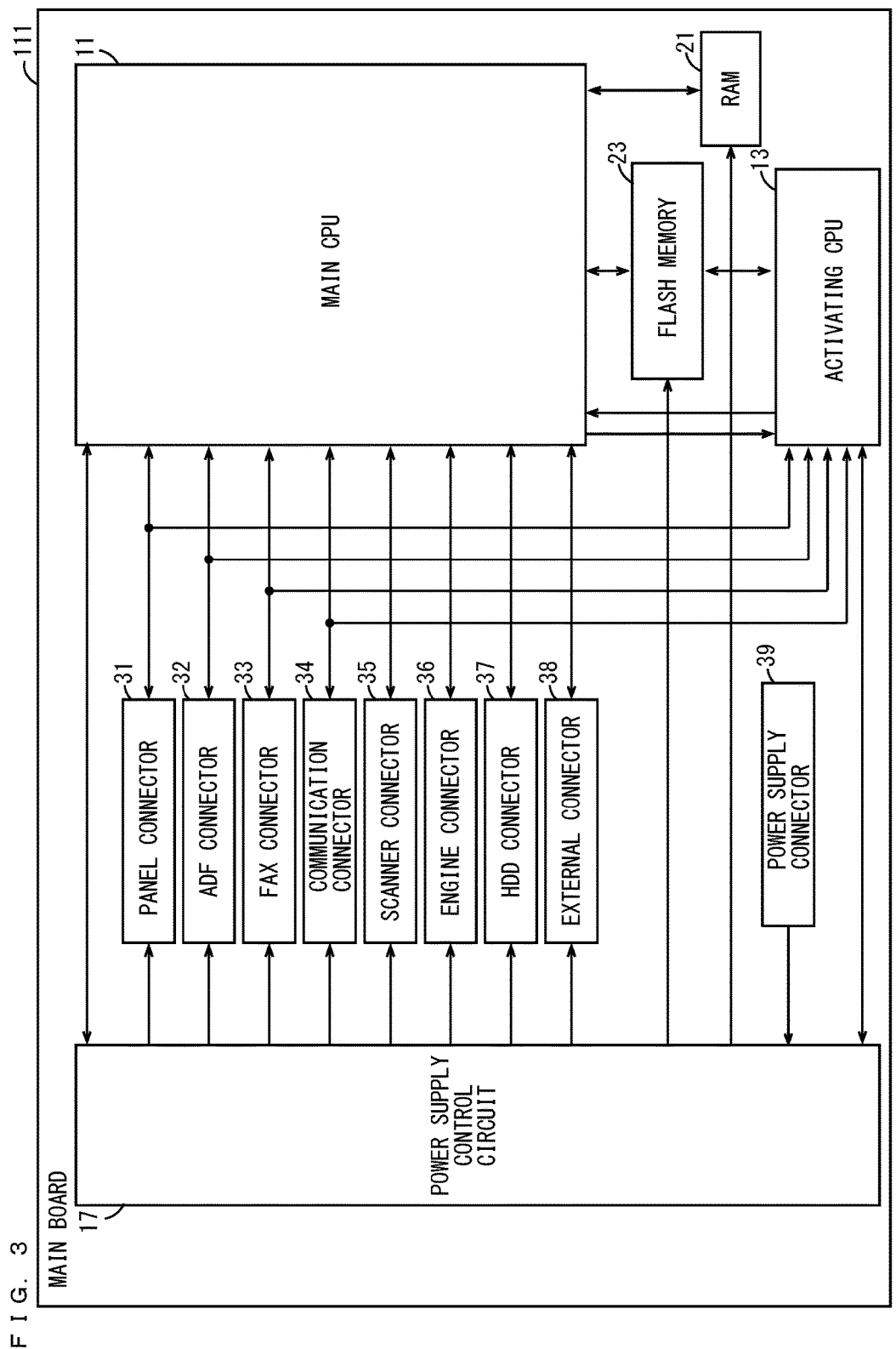
F I G. 3

F I G. 5

ACTIVATION FACTOR TABLE

| STATE | ACTIVATION FACTOR | HARDWARE RESOURCE |
|---|---|---|
| STATE A | PANEL KEY | OPERATION PANEL |
| | | DOCUMENT SCANNING UNIT |
| | | IMAGE FORMING UNIT |
| | | PAPER FEED UNIT |
| | | AUTOMATIC DOCUMENT FEEDER |
| | | FACSIMILE UNIT |
| | | COMMUNICATION I/F UNIT |
| | | HDD |
| | | EXTERNAL STORAGE DEVICE |
| STATE B | DOCUMENT PLACEMENT | OPERATION PANEL |
| | | DOCUMENT SCANNING UNIT |
| | | AUTOMATIC DOCUMENT FEEDER |
| | | HDD |
| | | |
| STATE C | FASCIMILE INCOMING CALL | IMAGE FORMING UNIT |
| | | PAPER FEED UNIT |
| | | FACSIMILE UNIT |
| | | |
| STATE D | DATA RECEPTION | IMAGE FORMING UNIT |
| | | PAPER FEED UNIT |
| | | COMMUNICATION I/F UNIT |
| | | |

FIG. 6

ACTIVATION FACTOR TABLE

| STATE | ACTIVATION FACTOR | HARDWARE RESOURCE |
|---|---|---|
| STATE A | PANEL KEY | OPERATION PANEL |
| | | DOCUMENT SCANNING UNIT |
| | | IMAGE FORMING UNIT |
| | | PAPER FEED UNIT |
| | | FINISHER |
| | | AUTOMATIC DOCUMENT FEEDER |
| | | FACSIMILE UNIT |
| | | COMMUNICATION I/F UNIT |
| | | HDD |
| | | EXTERNAL STORAGE DEVICE |
| STATE B | DOCUMENT PLACEMENT | OPERATION PANEL |
| | | DOCUMENT SCANNING UNIT |
| | | AUTOMATIC DOCUMENT FEEDER |
| | | HDD |
| STATE C | FASCIMILE INCOMING CALL | IMAGE FORMING UNIT |
| | | PAPER FEED UNIT |
| | | FACSIMILE UNIT |
| STATE D | DATA RECEPTION | IMAGE FORMING UNIT |
| | | PAPER FEED UNIT |
| | | COMMUNICATION I/F UNIT |
| | | FINISHER |

F I G. 7

SNAPSHOT DEFINITION TABLE

| ACTIVATION FACTOR | ADDRESS INFORMATION |
|---|---|
| PANEL KEY | ADDRESS A |
| DOCUMENT PLACEMENT | ADDRESS B |
| FASCIMILE INCOMING CALL | ADDRESS C |
| DATA RECEPTION | ADDRESS D |

FIG. 12

ACTIVATION FACTOR TABLE

| STATE | ACTIVATION FACTOR | HARDWARE RESOURCE | PROGRAM |
|---|---|---|---|
| STATE A | PANEL KEY | OPERATION PANEL | PANEL CONTROL PROGRAM |
| | | DOCUMENT SCANNING UNIT | SCANNER CONTROL PROGRAM |
| | | IMAGE FORMING UNIT | ENGINE CONTROL PROGRAM |
| | | PAPER FEED UNIT | TRANSPORT CONTROL PROGRAM |
| | | AUTOMATIC DOCUMENT FEEDER | ADF CONTROL PROGRAM |
| | | FACSIMILE UNIT | FACSIMILE CONTROL PROGRAM |
| | | COMMUNICATION I/F UNIT | COMMUNICATION CONTROL PROGRAM |
| | | HDD | OVERALL CONTROL PROGRAM |
| | | EXTERNAL STORAGE DEVICE | |
| STATE B | DOCUMENT PLACEMENT | OPERATION PANEL | PANEL CONTROL PROGRAM |
| | | DOCUMENT SCANNING UNIT | SCANNER CONTROL PROGRAM |
| | | AUTOMATIC DOCUMENT FEEDER | ADF CONTROL PROGRAM |
| | | HDD | OVERALL CONTROL PROGRAM |
| | | | |
| STATE C | FASCIMILE INCOMING CALL | IMAGE FORMING UNIT | ENGINE CONTROL PROGRAM |
| | | PAPER FEED UNIT | TRANSPORT CONTROL PROGRAM |
| | | FACSIMILE UNIT | FACSIMILE CONTROL PROGRAM |
| | | | OVERALL CONTROL PROGRAM |
| | | | |
| STATE D | DATA RECEPTION | IMAGE FORMING UNIT | ENGINE CONTROL PROGRAM |
| | | PAPER FEED UNIT | TRANSPORT CONTROL PROGRAM |
| | | COMMUNICATION I/F UNIT | COMMUNICATION CONTROL PROGRAM |
| | | | OVERALL CONTROL PROGRAM |
| | | | |

FIG. 14

ACTIVATION FACTOR TABLE

| STATE | ACTIVATION FACTOR | HARDWARE RESOURCE | PROGRAM |
|---|---|---|---|
| STATE A | PANEL KEY | OPERATION PANEL | PANEL CONTROL PROGRAM |
| | | DOCUMENT SCANNING UNIT | SCANNER CONTROL PROGRAM |
| | | IMAGE FORMING UNIT | ENGINE CONTROL PROGRAM |
| | | PAPER FEED UNIT | TRANSPORT CONTROL PROGRAM |
| | | AUTOMATIC DOCUMENT FEEDER | ADF CONTROL PROGRAM |
| | | FACSIMILE UNIT | FACSIMILE CONTROL PROGRAM |
| | | COMMUNICATION I/F UNIT | COMMUNICATION CONTROL PROGRAM |
| | | FINISHER | FINISHER CONTROL PROGRAM |
| | | HDD | OVERALL CONTROL PROGRAM |
| | | EXTERNAL STORAGE DEVICE | |
| STATE B | DOCUMENT PLACEMENT | OPERATION PANEL | PANEL CONTROL PROGRAM |
| | | DOCUMENT SCANNING UNIT | SCANNER CONTROL PROGRAM |
| | | AUTOMATIC DOCUMENT FEEDER | ADF CONTROL PROGRAM |
| | | HDD | OVERALL CONTROL PROGRAM |
| STATE C | FASCIMILE INCOMING CALL | IMAGE FORMING UNIT | ENGINE CONTROL PROGRAM |
| | | PAPER FEED UNIT | TRANSPORT CONTROL PROGRAM |
| | | FACSIMILE UNIT | FACSIMILE CONTROL PROGRAM |
| | | | OVERALL CONTROL PROGRAM |
| STATE D | DATA RECEPTION | IMAGE FORMING UNIT | ENGINE CONTROL PROGRAM |
| | | PAPER FEED UNIT | TRANSPORT CONTROL PROGRAM |
| | | COMMUNICATION I/F UNIT | COMMUNICATION CONTROL PROGRAM |
| | | FINISHER | FINISHER CONTROL PROGRAM |
| | | | OVERALL CONTROL PROGRAM | though
IMAGE FORMING APPARATUS, ACTIVATION CONTROL METHOD AND NON-TRANSITORY COMPUTER-READABLE RECORDING MEDIUM ENCODED WITH ACTIVATION CONTROL PROGRAM This U.S. patent application is entitled to and claims the benefit of Japanese Patent Application No. 2016-029797, filed with the Japan Patent Office on Feb. 19, 2016, the entire content of which is hereby incorporated by reference.

BACKGROUND OF THE INVENTION

Field of the Invention

The present invention relates to an image forming apparatus, an activation control method and an activation control program. More specifically, the present invention relates to an image forming apparatus capable of switching an operation mode to a power saving mode in which power consumption is low, an activation control method for the image forming apparatus and an activation control program that allows a computer controlling the image forming apparatus to perform the activation control method.

Description of the Related Art

In recent years, there has been a growing demand for reducing power consumption of image forming apparatuses typified by MFPs (Multi Function Peripherals) in a standby state where the image forming apparatuses are not driven. Thus, MFPs, which stop driving of CPUs (Central Processing Units) controlling the MFPs and RAMs (Random Access Memories) being used by the CPUs as work areas in the standby state, have been developed. Meanwhile, it is necessary to minimize the time required for bringing the MFP into a state where the MFP is recovered from the standby state and the CPU can execute a program.

As a technology for reducing the time required for bringing the MFP into a state where the CPU can execute a program, the invention described in Japanese Patent Laid-Open No. 2015-123650 is known, for example. In Japanese Laid-Open No. 2015-123650, an image forming apparatus that makes transition to a first power state or a second power state where power consumption is lower than power consumption in the first power state, includes a printer means, a control means that controls a plurality of devices including the printer means, a power supply means that supplies power to the printing means and the control means, and a storage means that stores an activation method of the printer means for the case where the control means is activated at a high speed, wherein the control means, in the case where the image forming apparatus is recovered to attain the first power state after transition to the second power state, dynamically switches the activation methods such that the printer means is activated by the activation method of the printing means stored in the storage means and controls the printer means.

However, in the case where the power supply state of the plurality of devices is changed to a high-power supply state after being changed to a low-power supply state, sometimes not all of the plurality of devices have to be activated depending on the use of the image forming apparatus. In the image forming apparatus described in Japanese Patent Laid-Open No. 2015-123650, all of the plurality of devices are activated, so that there is a problem that a device that is not to be used is activated and power is consumed.

SUMMARY OF THE INVENTION

According to one aspect of the present invention, an image forming apparatus includes a main controller that executes a program, a volatile first storage that stores an execution program loaded for execution of the program by the main controller, a sub-controller that activates the main controller, a non-volatile second storage that is accessible by the main controller and the sub-controller, and an associator that associates one or more of a plurality of hardware resources controlled by the main controller with each of a plurality of activation factors, wherein the main controller includes a mode switcher that switches an operation mode from a driving mode in which power is supplied to a stop mode in which power is not supplied, the sub-controller includes a shut-off controller that, in response to switching of the operation mode to the stop mode by the mode switcher, shuts off power supply to the main controller, the first storage and the plurality of hardware resources, an activation factor detector that, during a period in which power is not supplied to the main controller, detects any of the plurality of activation factors, a power recoverer that, in response to detection of any of the plurality of activation factors by the activation factor detector, supplies power to the main controller, the first storage and one or more hardware resources associated with the detected activation factor among the plurality of hardware resources, and an activator that, in response to detection of any of the plurality of activation factors by the activation factor detector, activates the main controller, the second storage, for each of the plurality of activation factors, stores a snapshot, which is data stored in the first storage with power supplied to one or more hardware resources associated with the activation factor by the associator, and the main controller includes a recoverer that, in response to activation by the activator, reads out a snapshot corresponding to the detected activation factor from among a plurality of snapshots stored in the second storage from the second storage, and stores the snapshot in the first storage.

According to another aspect of the present invention, an activation control method performed in an image forming apparatus, the image forming apparatus includes a main controller that executes a program, a volatile first storage that stores an execution program loaded for execution of the program by the main controller, a sub-controller that activates the main controller, and a non-volatile second storage that is accessible by the main controller and the sub-controller, and the activation control method allowing any one of the main controller and the sub-controller to perform an association step of associating one or more of a plurality of hardware resources controlled by the main controller with each of a plurality of activation factors, the main controller to perform a mode switching step of switching an operation mode from a driving mode in which power is supplied to a stop mode in which power is not supplied, and the sub-controller to perform a shut-off control step of, in response to switching of the operation mode to the stop mode in the mode switching step, shutting off power supply to the main controller, the first storage and the plurality of hardware resources, and an activation factor detection step of, during a period in which power is not supplied to the main controller, detecting any of the plurality of activation factors, a power recovery step of, in response to detection of any of the plurality of activation factors in the activation factor detection step, supplying power to the main controller, the first storage and one or more hardware resources associated with the detected activation factor among the plurality of hardware resources, and an activation step of, in response to detection of any of the plurality of activation factors in the activation factor detection step, activating the main controller, wherein the second storage, for each of the plurality of activation factors, stores a snapshot, which is data stored in the first storage with power supplied to the one or more hardware resources associated with the activation factor by the associator, and the activation control method further allows the main controller to perform a recovery step of, in response to activation in the activation step, reading out a snapshot corresponding to the detected activation factor from among a plurality of snapshots stored in the second storage from the second storage, and storing the snapshot in the first storage.

According to yet another aspect of the prevention, an activation control program executed in an image forming apparatus, the image forming apparatus includes a main controller that executes a program, a volatile first storage that stores an execution program loaded for execution of the program by the main controller, a sub-controller that activates the main controller, and a non-volatile second storage that is accessible by the main controller and the sub-controller, and the activation control program allowing any one of the main controller and the sub-controller to perform an association step of associating one or more of a plurality of hardware resources controlled by the main controller with each of a plurality of activation factors, the main controller to perform a mode switching step of switching an operation mode from a driving mode in which power is supplied to a stop mode in which power is not supplied, and the sub-controller to perform a shut-off control step of, in response to switching of the operation mode to the stop mode in the mode switching step, shutting off power supply to the main controller, the first storage and the plurality of hardware resources, and an activation factor detection step of, during a period in which power is not supplied to the main controller, detecting any of the plurality of activation factors, a power recovery step of, in response to detection of any of the plurality of activation factors in the activation factor detection step, supplying power to the main controller, the first storage and one or more hardware resources associated with the detected activation factor among the plurality of hardware resources, and an activation step of, in response to detection of any of the plurality of activation factors in the activation factor detection step, activating the main controller, wherein the second storage, for each of the plurality of activation factors, stores a snapshot, which is data stored in the first storage with power supplied to the one or more hardware resources associated with the activation factor by the associator, and the activation control program further allows the main controller to perform a recovery step of, in response to activation in the activation step, reading out a snapshot corresponding to the detected activation factor from among a plurality of snapshots stored in the second storage from the second storage, and storing the snapshot in the first storage.

The foregoing and other features, aspects, and advantages of the present invention will become more apparent from the following detailed description of the present invention when taken in conjunction with the accompanying drawings.

BRIEF DESCRIPTION OF THE DRAWINGS

FIG. 1 is a perspective view showing an appearance of an MFP in one embodiment;

FIG. 2 is a block diagram showing one example of an outline of a hardware configuration of the MFP;

FIG. 3 is a block diagram showing one example of a detailed configuration of a main board;

FIG. 5 is a diagram showing one example of an activation factor table;

FIG. 6 is a diagram showing one example of a changed activation factor table;

FIG. 7 is a diagram showing one example of a snapshot definition table;

FIG. 12 is a diagram showing one example of an activation factor table in the modified example;

FIG. 14 is a diagram showing one example of a changed activation factor table in the modified example.

DETAILED DESCRIPTION

Figure 4:
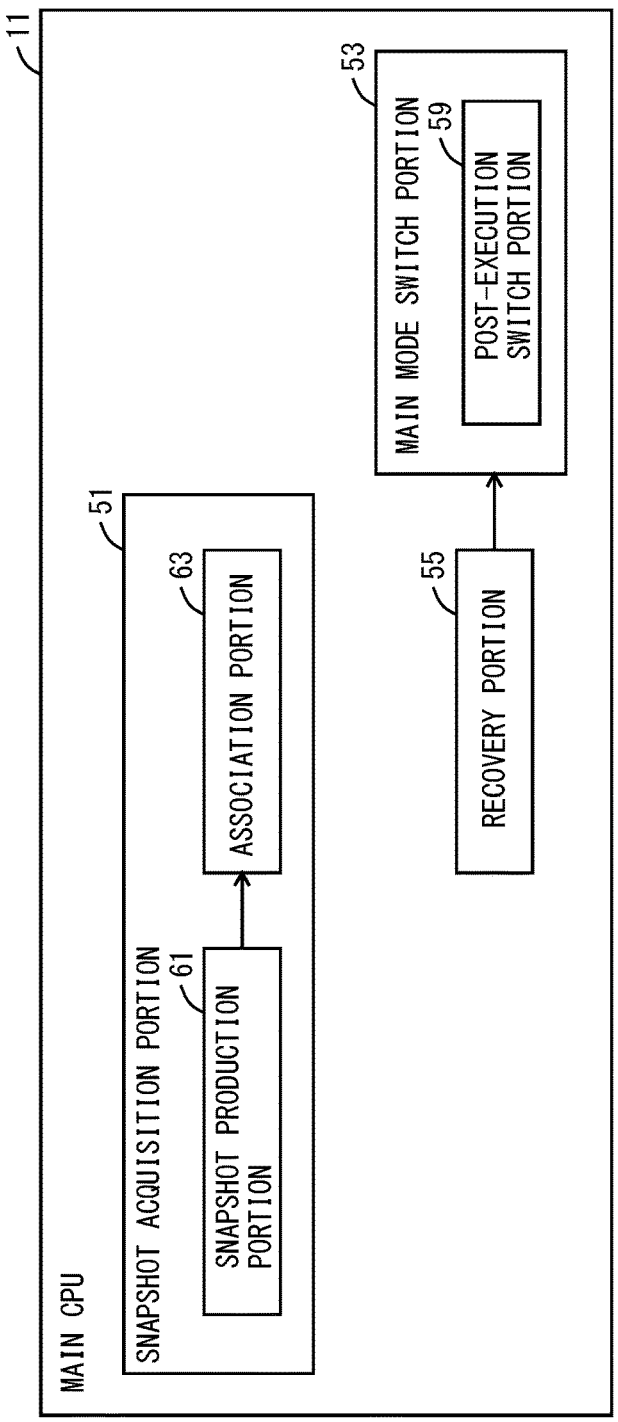
FIG. 4 is a block diagram showing one example of functions of a main CPU.

An embodiment of the present invention will be described below with reference to drawings. In the following description, the same parts are denoted with the same reference characters. Their names and functions are also the same. Thus, a detailed description thereof will not be repeated.

FIG. 1 is a perspective view showing an appearance of an MFP in one embodiment of the present invention. Referring to FIG. 1, the MFP 100 is one example of an image forming apparatus and includes a document scanning unit 130 for scanning a document, an automatic document feeder 120 for transporting a document to the document scanning unit 130, an image forming unit 140 for forming an image on a sheet of paper or other medium based on image data output by the document scanning unit 130 scanning a document, and a paper feed unit 150 for supplying a sheet of paper to the image forming unit 140, and an operation panel 190 as a user interface.

The automatic document feeder 120 automatically transports a plurality of documents set on a document feed tray to a predetermined document scanning position set on a platen glass of the document scanning unit 130 one by one, and discharges the document of which a document image is scanned by the document scanning unit 130 onto a document discharge tray. The document scanning unit 130 includes a light source that irradiates the document transported to the document scanning position with light, and an optoelectronic transducer that receives the light reflected by the document and scans the document image according to a size of the document. The optoelectronic transducer converts the received light into image data, which is an electric signal, and outputs the image data to the image forming unit 140. The paper feed unit 150 has a plurality of paper feed trays. Each of the plurality of paper feed trays stores the sheets of paper of a predetermined size. The paper feed unit 150 takes out sheets of paper from a paper feed tray that stores sheets of paper of a size used for image formation among the plurality of paper feed trays one by one, and transports the taken sheet of paper to the image forming unit 140.

The image forming unit 140 forms an image by a well-known electrophotographic method, and forms an image on the sheet of paper transported by the paper feed unit 150 based on image data on which a data process is performed or image data that is externally received. The data process includes various data processes such as shading correction performed on the image data received from the document scanning unit 130.

The operation panel 190 is provided on an upper surface of the MFP 100, displays an operation screen and the like, and functions as the user interface that accepts an operation by a user.

FIG. 2 is a block diagram showing one example of an outline of a hardware configuration of the MFP. Referring to FIG. 2, the MFP 100 includes a main board 111, a communication interface (I/F) unit 160, a facsimile unit 170, the operation panel 190, an external storage device 115 and a hard disc drive (HDD) 113 as a mass storage device in addition to the automatic document feeder 120, the document scanning unit 130, the image forming unit 140 and the paper feed unit 150 that are described above.

The main board 111 is connected to the automatic document feeder 120, the document scanning unit 130, the image forming unit 140, the paper feed unit 150, the communication I/F unit 160, the facsimile unit 170, an external storage device 115, the HDD 113 and the operation panel 190.

The communication I/F unit 160 is an interface for connecting the MFP 100 to a network. The communication I/F unit 160 communicates with another computer connected to the network by a communication protocol such as a TCP (Transmission Control Protocol) or a UDP (User Datagram Protocol). The protocol for communication is not limited in particular, and any protocol can be used. Further, the network to which the communication I/F unit 160 is connected is, for example, a local area network (LAN) and either wired or wireless. The network is not limited to the LAN but may be a wide area network (WAN), a network using the Public Switched Telephone Networks or other networks. Further, the network is connected to the Internet. The MFP 100 therefore can communicate with a computer such as a server connected to the Internet.

The communication I/F unit 160 outputs data received from the network to the main board 111 and outputs data input from main board 111 to the network. The communication I/F unit 160 outputs only the data, addressed to MFP 100 among data received from the network, to the main board 111 and discards the data addressed to a device different from MFP 100 among the data received from the network. Further, in the case where receiving the data, which is addressed to MFP 100 among the data received from the network and is an discovery command for inquiring about a domain name, a MAC address, an IP address and the like, the communication I/F unit 160 returns a response without outputting the data to the main board 111. A discovery command for inquiring about a MAC address is, for example, data in accordance with ARP (Address Resolution Protocol) standards.

The facsimile unit 170 is connected to the Public Switched Telephone Networks (PSTN) to transmit and receive facsimile data. A CD-ROM (Compact Disk Read Only Memory) 115A or a semiconductor memory is mounted on the external storage device 115. The external storage device 115 reads out data stored in the CD-ROM 115A or the semiconductor memory. The external storage device 115 stores data in the CD-ROM 115A or the semiconductor memory.

The operation panel 190 includes a display unit 195 and an operation unit 196. The display unit 195 is, for example, a liquid crystal display (LCD) and displays instruction menus to users, information about the acquired image data and other data. The operation unit 196 includes a plurality of hard keys and a touch panel. The touch panel is a multi-touch-supporting touch panel provided on an upper surface or a lower surface of display unit 195 in a superimposed manner and detects a position designated by the user in the display surface of display unit 195.

FIG. 3 is a block diagram showing one example of a detailed configuration of the main board. Referring to FIG. 3, the main board 111 includes a main CPU 11, an activating CPU 13, a power supply control circuit 17, a RAM 21, a flash memory 23 and connectors 31 to 39.

The RAM 21 is a volatile semiconductor memory used as a work area of the main CPU 11. The flash memory 23 is a non-volatile semiconductor memory controlled by the main CPU 11 or the activating CPU 13.

The panel connector 31 is connected to the operation panel 190 and electrically connects the operation panel 190 and the main CPU 11 to each other. Power is supplied to the operation panel 190 from the power supply control circuit 17 via the panel connector 31. When the user inputs an operation to the operation unit 196, the operation unit 196 included in the operation panel 190 detects the input operation and outputs operation identification information for identifying the detected operation to the panel connector 31. Operations output by the user to the operation unit 196 include an operation of pressing a plurality of hard keys included in the operation unit 196 and an operation of designating a position on the touch panel. When any of a plurality of panel keys, which are the hard keys of the operation unit 196, is pressed with power not supplied from the power supply control circuit 17, a voltage, of a key terminal connected to the activating CPU 13 among a plurality of terminals of the panel connector 31, is changed from LOW to HIGH.

The ADF connector 32 is connected to the automatic document feeder 120 and electrically connects the automatic document feeder 120 and the main CPU 11 to each other. Power is supplied to the automatic document feeder 120 from the power supply control circuit 17 via the ADF connector 32. The automatic document feeder 120 has a plurality of mechanical switches. The automatic document feeder 120 has a capacitor. In the case where any of the plurality of mechanical switches is changed from OFF to ON with power not supplied from the power supply control circuit 17, a voltage, of a switch terminal connected to the activating CPU 13 among a plurality of terminals of the ADF connector 32, is changed from LOW to HIGH. The plurality of mechanical switches include a switch for detecting a document and a switch for detecting a state where the automatic document feeder 120 is opened.

The FAX connector 33 is connected to the facsimile unit 170 and electrically connects the facsimile unit 170 and the main CPU 11 to each other. Power is supplied to the facsimile unit 170 from the power supply control circuit 17 via the FAX connector 33. In the case where receiving facsimile data, the facsimile unit 170 outputs the received facsimile data to the main CPU 11 via the FAX connector 33. The facsimile unit 170 transmits the facsimile data input by the main CPU 11 via the FAX connector 33. The facsimile unit 170 can detect an incoming call with power not supplied from the power supply control circuit 17. When detecting an incoming call with power not supplied from the power supply control circuit 17, the facsimile unit 170 changes a voltage, of an incoming call notification terminal connected to the activating CPU 13 among a plurality of terminals of the FAX connector 33, from LOW to HIGH.

The communication connector 34 is connected to the communication I/F unit 160 and electrically connects the communication I/F unit 160 and the main CPU 11 to each other. Power is supplied to the communication I/F unit 160 from the power supply control circuit 17 via the communication connector 34. The communication I/F unit 160 has a capacitor. In the case where receiving a discovery command with power not supplied from the power supply control circuit 17, the communication I/F unit 160 can return a response. In the case where receiving data, addressed to the NFP 100, except for the discovery command from outside with power not supplied from the power control circuit 17, the communication I/F unit 160 changes a voltage, of a reception notification terminal connected to the activating CPU 13 among a plurality of terminals of the communication connector 34, from LOW to HIGH.

The scanner connector 35 is connected to the document scanning unit 130 and electrically connects the document scanning unit 130 and the main CPU 11 to each other. Power is supplied to the document scanning unit 130 from the power supply control circuit 17 via the scanner connector 35. The engine connector 36 is connected to the image forming unit 140 and the paper feed unit 150, and electrically connects each of the image forming unit 140 and the paper feed unit 150 to the main CPU 11. Power is supplied to each of the image forming unit 140 and the paper feed unit 150 from the power supply control circuit 17 via the engine connector 36. The HDD connector 37 is connected to the HDD 113 and electrically connects the HDD 113 to the main CPU 11. Power is supplied to the HDD 113 from the power supply control circuit 17 via the HDD connector 37. The external connector 38 is connected to the external storage device 115 and electrically connects the external storage device 225 to the main CPU 11. Power is supplied to the external storage device 115 from the power supply control circuit 17 via the external connector 38.

The main CPU 11 can access the flash memory 23, and can read out the data stored in the flash memory 23 or write data into the flash memory 23.

In response to detection of an activation factor with the main CPU 11 not driven, the activating CPU 13 activates the main CPU 11. Specifically, the activating CPU 13 is connected to a reset terminal of the main CPU 11 and activates the main CPU 11 by outputting a reset signal to the reset terminal. The activating CPU 13 can access the flash memory 23, and can read out the data stored in the flash memory 23 or write data into the flash memory 23.

The activating CPU 13 is connected to the key terminal of the panel connector 31 and detects an activation factor in response to a change of the voltage of the key terminal from LOW to HIGH. The activating CPU 13 is connected to the switch terminal of the ADF connector 32 and detects an activation factor in response to a change of the voltage of the switch terminal from LOW to HIGH. The activating CPU 13 is connected to the incoming call notification terminal of the FAX connector 33 and detects an activation factor in response to a change of the voltage of the incoming call notification terminal from LOW to HIGH. The activating CPU 13 is connected to the reception notification terminal of the communication connector 34 and detects an activation factor in response to a change of the voltage of the reception notification terminal from LOW to HIGH.

The power supply control circuit 17 is connected to a commercial power supply via the power supply connector 39. The power supply control circuit 17 supplies the main CPU 11, the activating CPU 13, the RAM 21 and the flash memory 23 of the main board 111 with the power supplied from the commercial power supply and supplies the automatic document feeder 120, the document scanning unit 130, the image forming unit 140, the paper feed unit 150, the communication I/F unit 160, the facsimile unit 170, the external storage device 115, the HDD 113 and the operation panel 190 with the power supplied from the commercial power supply. The power supply control circuit 17 is controlled by the activating CPU 13 and switches a state of each of the main CPU 11, the activating CPU 13, the RAM 21, the flash memory 23, the automatic document feeder 120, the document scanning unit 130, the image forming unit 140, the paper feed unit 150, the communication I/F unit 160, the facsimile unit 170, the external storage device 115, the HDD 113 and the operation panel 190 between a state where power is supplied and a state where power is not supplied.

FIG. 4 is a block diagram showing one example of functions of the main CPU. The functions shown in FIG. 4 are formed in the main CPU 11 in the case where the main CPU 11 executes a main activation control program. The main activation control program is part of an activation control program. Referring to FIG. 4, the main CPU 11 includes a snapshot acquisition portion 51, a main mode switch portion 53 and a recovery portion 55.

The snapshot acquisition portion 51 acquires a snapshot. The snapshot is the data stored in the RAM 21 with one or more programs, among a plurality of programs stored in the flash memory 23, loaded into the RAM 21 by the main CPU 11. The snapshot acquisition portion 51 includes a snapshot production portion 61 and an association portion 63.

The snapshot production portion 61, for each of a plurality of activation factors, stores the data, which is stored in the RAM 21 in a state defined for the activation factor, in the flash memory 23 as a snapshot that is the image data. Therefore, the snapshot production portion 61 stores a plurality of snapshots respectively corresponding to a plurality of activation factors in the flash memory 23. The snapshot production portion 61 outputs an activation factor and an address in the flash memory 23 of the snapshot, which is stored in the flash memory 23, corresponding to the activation factor to the association portion 63.

Specifically, an activation factor table, which associates the state, the activation factor and the hardware resource with one another, is stored in advance in the flash memory 23. The snapshot production portion 61 stores a snapshot of each of the plurality of activation factors in the flash memory 23 with reference to the activation factor table. A state is defined by a set of hardware resources to which power is supplied among the plurality of hardware resources.

FIG. 5 is a diagram showing one example of the activation factor table. Referring to FIG. 5, the activation factor table includes a plurality of activation factor records in which the states, the activation factors and the hardware resources are associated with one another. Each activation factor record includes an item of the state, an item of the activation factor and an item of the hardware resource. State identification information for identifying the state is set in the item of the state, activation factor identification information for identifying the activation factor is set in the item of the activation factor, and hardware identification information for identifying the hardware resource is set in the item of the hardware resource. The hardware identification information of the operation panel 190 is referred to as "OPERATION PANEL", the hardware identification information of the document scanning unit 130 is referred to as "DOCUMENT SCANNING UNIT", the hardware identification information of the image forming unit 140 is referred to as "IMAGE FORMING UNIT", the hardware identification information of the paper feed unit 150 is referred to as "PAPER FEED UNIT", the hardware identification information of the automatic document feeder 120 is referred to as "AUTOMATIC DOCUMENT FEEDER", the hardware identification information of the facsimile unit 170 is referred to as "FACSIMILE UNIT", the hardware identification information of the communication I/F unit 160 is referred to as "COMMUNICATION I/F UNIT", the hardware identification information of the HDD 113 is referred to as "HDD" and the hardware identification information of the external storage device 115 is referred to as "EXTERNAL STORAGE DEVICE".

In the state identification information "STATE A", the activation factor identification information "PANEL KEY" is associated with the pieces of hardware identification information "OPERATION PANEL", "DOCUMENT SCANNING UNIT", "IMAGE FORMING UNIT", "PAPER FEED UNIT", "AUTOMATIC DOCUMENT FEEDER", "FACSIMILE UNIT" and "COMMUNICATION I/F UNIT". The activation factor identified by the activation factor identification information "PANEL KEY" indicates events in which the plurality of panel keys included in the operation unit 196 of the operation panel 190 are pressed.

In the state identification information "STATE B", the activation factor identification information "DOCUMENT PLACEMENT" is associated with the pieces of hardware identification information "OPERATION PANEL", "DOCUMENT SCANING UNIT", "PAPER FEED UNIT" and "AUTOMATIC DOCUMENT FEEDER". The activation factor identified by the activation factor identification information "DOCUMENT PLACEMENT" indicates an event in which a document is placed on the automatic document feeder 120 and an event in which the automatic document feeder 120 is changed to an opened state.

In the state identification information "STATE C", the activation factor identification information "FACSIMILE INCOMING CALL" is associated with the pieces of hardware identification information "IMAGE FORMING UNIT", "PAPER FEED UNIT" and "FACSIMILE UNIT". The activation factor identified by the activation factor identification information "FACSIMILE INCOMING CALL" indicates an event in which the facsimile unit 170 detects an incoming call.

In the state identification information "STATE D", the activation factor identification information "DATA RECEPTION" is associated with the pieces of hardware identification information "IMAGE FORMING UNIT", "PAPER FEED UNIT" and "COMMUNICATION I/F UNIT". The activation factor identified by the activation factor identification information "DATA RECEPTION" indicates an event in which the communication I/F unit 160 receives data addressed to the MFP 100.

Returning to FIG. 4, in the case where a snapshot is not stored in the flash memory 23, the snapshot production portion 61 makes transition of the state of the MFP 100 with reference to the activation factor table, and stores the data, which is stored in the RAM 21 after the transition of the state, in the flash memory 23 as the snapshot corresponding to the state after the transition. The snapshot production portion 61 outputs a set, of the activation factor identification information for identifying the activation factor corresponding to the state after the transition and the address information indicating a position in the flash memory 23 of the snapshot stored in the flash memory 23, to the association portion 63.

Specifically, the snapshot production portion 61, in the state of the state identification information "STATE A", stores the data, which is stored in the RAM 21, in the flash memory 23 as the snapshot corresponding to the state A. The snapshot production portion 61 outputs a set, of the activation factor identification information "PANEL KEY" corresponding to the state identification information "STATE A" and the address information indicating a position in the flash memory 23 of the snapshot stored in the flash memory 23, to the association portion 63. The state of the state identification information "STATE A" is the state where all of the hardware resources including the operation panel 190, the document scanning unit 130, the image forming unit 140, the paper feed unit 150, the automatic document feeder 120, the facsimile unit 170, the communication OF unit 160, the HDD 113 and the external storage device 115 receive power from the power supply control circuit 17 and are driven.

The snapshot production portion 61 makes transition of the state of the MFP 100 to the state of the state identification information "STATE B" and then stores the data, which is stored in the RAM 21, in the flash memory 23 as the snapshot corresponding to the state B. The snapshot production portion 61 outputs a set, of the activation factor identification information "DOCUMENT PLACEMENT" corresponding to the state identification information "STATE B" and the address information indicating a position in the flash memory 23 of the snapshot stored in the flash memory 23, to the association portion 63. The state of the state identification information "STATE B" is the state where the operation panel 190, the document scanning unit 130, the automatic document feeder 120 and the HDD 113 receive power from the power supply control circuit 17 and are driven. Therefore, the snapshot production portion 61 makes transition of the state of the MFP 100 to the state of the state identification information "STATE B" by controlling the image forming unit 140, the paper feed unit 150, the facsimile unit 170, the communication OF unit 160 and the external storage device 115 to stop being driven and controlling the power supply control circuit 17 to shut off the power supply to the image forming unit 140, the paper feed unit 150, the facsimile unit 170, the communication OF unit 160 and the external storage device 115.

The snapshot production portion 61 makes transition of the state of the MFP 100 from the state of the state identification information "STATE B" to the state of the state identification information "STATE C" and then stores the data, which is stored in the RAM 21, in the flash memory 23 as the snapshot corresponding to the state C. The snapshot production portion 61 outputs a set, of the activation factor identification information "FACSIMILE INCOMING CALL" corresponding to the state identification information "STATE C" and the address information indicating a position in the flash memory 23 of the snapshot stored in the flash memory 23, to the association portion 63. The state of the state identification information "STATE C" is the state where the image forming unit 140, the paper feed unit 150 and the facsimile unit 170 receive power from the power supply control circuit 17 and are driven. Therefore, the snapshot production portion 61 controls the power supply control circuit 17 to supply power to the image forming unit 140, the paper feed unit 150 and the facsimile unit 170, and activates the image forming unit 140, the paper feed unit 150 and the facsimile unit 170. Further, the snapshot production portion 61 makes transition of the state of the MFP 100 from the state of the state identification information "STATE B" to the state of the state identification information "STATE C" by controlling the operation panel 190, the document scanning unit 130 and the automatic document feeder 120 to stop being driven and controlling the power supply control circuit 17 to shut off the power supply to the operation panel 190, the document scanning unit 130 and the automatic document feeder 120.

The snapshot production portion 61 makes transition of the state of the MFP 100 from the state of the state identification information "STATE C" to the state identification information "STATE D" and then stores the data, which is stored in the RAM 21, in the flash memory 23 as the snapshot corresponding to the state D. The snapshot production portion 61 outputs a set, of the activation factor identification information "DATA RECEPTION" corresponding to the state identification information "STATE D" and the address information indicating a position in the flash memory 23 of the snapshot stored in the flash memory 23, to the association portion 63. The state of the state identification information "STATE D" is the state where the image forming unit 140, the paper feed unit 150 and the communication I/F unit 160 receive power from the power supply control circuit 17 and are driven. Therefore, the snapshot production portion 61 controls the power supply control circuit 17 to supply power to the communication IF unit 160 and activates the communication I/F unit 160. Further, the snapshot production portion 160 makes transition of the state of the MFP 100 from the state of the state identification information "STATE C" to the state identification information "STATE D" by controlling the facsimile unit 170 to stop being driven and controlling the power supply control circuit 17 to shut off the power supply to the facsimile unit 170.

Further, the snapshot production portion 61, in a stage before the production of a snapshot with the MFP 100 in the state of the state identification information "STATE A", outputs a snapshot production instruction to the operation panel 190, the document scanning unit 130, the image forming unit 140, the paper feed unit 150, the automatic document feeder 120, the facsimile unit 170 and the communication I/F unit 160.

As shown in FIG. 1, each of the operation panel 190, the document scanning unit 130, the document forming unit 140, the paper feed unit 150, the automatic document feeder 120, the facsimile unit 170 and the communication I/F unit 160 includes at least a CPU, a RAM and a flash memory, and stores the data which is stored in the RAM in the flash memory as a hardware snapshot in response to reception of the snapshot production instruction from the main CPU 11.

Specifically, the operation panel 190 includes a CPU 191, a ROM 192, a RAM 193 and a flash memory 194. In response to reception of the snapshot production instruction from the main CPU 11, the CPU 191 stores the data, which is stored in the RAM 193, in the flash memory 194 as a hardware snapshot. In the case where being activated by the main CPU 11, the CPU 191 loads a program stored in the ROM 192 into the RAM 193, and then executes an initial setting process of transmitting data to and receiving data from the main CPU 11 to be controllable by the main CPU 11. The hardware snapshot stored in the flash memory 194 by the CPU 191 in response to the reception of the snapshot production instruction from the main CPU 11 is the data that is stored in the RAM 193 when the CPU 191 is controllable by the main CPU 11. In response to reception of an activation instruction from the activating CPU 13, the CPU 191 of the operation panel 190 stores the hardware snapshot, which is stored in the flash memory 194, in the RAM 193. In this case, because the time required for loading the program stored in the ROM 192 into the RAM 193 and the time required for executing the initial setting process of transmitting data to and receiving data from the main CPU 11 after the program is loaded into the RAM 193 are not necessary, a time period from the time when the activation instruction is received from the activating CPU 13 until the time when the CPU 191 becomes controllable by the main CPU 11 is reduced as compared to the case where the CPU 191 is activated by the main CPU 11.

The automatic document feeder 120 includes a CPU 121, a ROM 122, a RAM 123 and a flash memory 124. In response to reception of the snapshot production instruction from the main CPU 11, the CPU 121 stores the data, which is stored in the RAM 123, in the flash memoryl 24 as a hardware snapshot. In the case where being activated by the main CPU 11, the CPU 121 loads a program stored in the ROM 122 into the RAM 123, and then executes the initial setting process of transmitting data to and receiving data from the main CPU 11 to be controllable by the main CPU 11. The hardware snapshot stored in the flash memory 124 by the CPU 121 in response to the reception of the snapshot production instruction from the main CPU 11 is the data that is stored in the RAM 123 when the CPU 121 is controllable by the main CPU 11. In the case where the CPU 121 is activated by the activating CPU 13, the time required for the CPU 121 to become controllable by the main CPU 11 is reduced as compared to the case where the CPU 121 is activated by the main CPU 11.

The document scanning unit 130 includes a CPU 131, a ROM 132, a RAM 133 and a flash memory 134. In response to reception of the snapshot production instruction from the main CPU 11, the CPU 131 stores the data, which is stored in the RAM 133, in the flash memory 134 as a hardware snapshot. In the case where being activated by the main CPU 11, the CPU 131 loads a program stored in the ROM 132 into the RAM 133, and then executes the initial setting process of transmitting data to and receiving data from the main CPU 11 to be controllable by the main CPU 11. The hardware snapshot stored in the flash memory 134 by the CPU 131 in response to the reception of the snapshot production instruction from the main CPU 11 is the data that is stored in the RAM 133 when the CPU 131 is controllable by the main CPU 11. In the case where the CPU 131 is activated by the activating CPU 13, the time required for the CPU 131 to become controllable by the main CPU 11 is reduced as compared to the case where the CPU 131 is activated by the main CPU 11.

The image forming unit 140 includes a CPU 141, a ROM 142, a RAM 143 and a flash memory 144. In response to reception of the snapshot production instruction from the main CPU 11, the CPU 141 stores the data, which is stored in the RAM 143, in the flash memory 144 as a hardware snapshot. In the case where being activated by the main CPU 11, the CPU 141 loads a program stored in the ROM 142 into the RAM 143, and then executes the initial setting process of transmitting data to and receiving data from the main CPU 11 to be controllable by the main CPU 11. The hardware snapshot stored in the flash memory 144 by the CPU 141 in response to the reception of the snapshot production instruction from the main CPU 11 is the data that is stored in the RAM 143 when the CPU 141 is controllable by the main CPU 11. In the case where the CPU 141 is activated by the activating CPU 13, the time required for the CPU 141 to become controllable by the main CPU 11 is reduced as compared to the case where the CPU 141 is activated by the main CPU 11.

The paper feed unit 150 includes a CPU 151, a ROM 152, a RAM 153 and a flash memory 154. In response to reception of the snapshot production instruction from the main CPU 11, the CPU 151 stores the data, which is stored in the RAM 153, in the flash memory 154 as a hardware snapshot. In the case where being activated by the main CPU 11, the CPU 151 loads a program stored in the ROM 152 into the RAM 153 and then executes the initial setting process of transmitting data to and receiving data from the main CPU 11 to be controllable by the main CPU 11. The hardware snapshot stored in the flash memory 154 by the CPU 151 in response to the reception of the snapshot production instruction from the main CPU 11 is the data that is stored in the RAM 153 when the CPU 151 is controllable by the main CPU 11. In the case where the CPU 151 is activated by the activating CPU 13, the time required for the CPU 151 to become controllable by the main CPU 11 is reduced as compared to the case where the CPU 151 is activated by the main CPU 11.

The communication OF unit 160 includes a CPU 161, a ROM 162, a RAM 163 and a flash memory 164. In response to reception of the snapshot production instruction from the main CPU 11, the CPU 161 stores the data, which is stored in the RAM 163, in the flash memory 164 as a hardware snapshot. In the case where being activated by the main CPU 11, the CPU 161 loads a program stored in the ROM 162 into the RAM 163, and then executes the initial setting process of transmitting data to and receiving data from the main CPU 11 to be controllable by the main CPU 11. The hardware snapshot stored in the flash memory 164 by the CPU 161 in response to the reception of the snapshot production instruction from the main CPU 11 is the data that is stored in the RAM 163 when the CPU 161 is controllable by the main CPU 11. In the case where the CPU 161 is activated by the activating CPU 13, the time required for the CPU 161 to become controllable by the main CPU 11 is reduced as compared to the case where the CPU 161 is activated by the main CPU 11.

The facsimile unit 170 includes a CPU 171, a ROM 172, a RAM 173 and a flash memory 174. In response to reception of the snapshot production instruction from the main CPU 11, the CPU 171 stores the data, which is stored in the RAM 173, in the flash memory 174 as a hardware snapshot. In the case where being activated by the main CPU 11, the CPU 171 loads a program stored in the ROM 172 into the RAM 173, and then executes the initial setting process of transmitting data to and receiving data from the main CPU 11 to be controllable by the main CPU 11. The hardware snapshot stored in the flash memory 174 by the CPU 171 in response to the reception of the snapshot production instruction from the main CPU 11 is the data that is stored when the CPU 171 is controllable by the main CPU 11. In the case where the CPU 171 is activated by the activating CPU 13, the time required for the CPU 171 to become controllable by the main CPU 11 is reduced as compared to the case where the CPU 171 is activated by the main CPU 11.

Further, in the case where a snapshot is stored in the flash memory 23, when the activation factor table stored in the flash memory 23 is changed, the snapshot production portion 61 makes transition of the state of the MFP 100 with reference to the changed activation factor table, and stores the data, which is stored in the RAM 21 after the transition of the state, in the flash memory 23 as a snapshot corresponding to the state after the transition. The snapshot production portion 61 outputs a set, of the activation factor identification information for identifying an activation factor corresponding to the state after the transition and the address information indicating a position in the flash memory 23 of the snapshot stored in the flash memory 23, to the association portion 63.

The activation factor table is changed in the case where a hardware resource is added to or deleted from the MFP 100. In the case where a new hardware resource is added to the MFP 100 or the case where a hardware resource is deleted from the MFP 100, the snapshot production portion 61 stores a snapshot for each of the plurality of states defined by the activation factor table in the flash memory 23. For example, the case where a finisher is added to the MFP 100 as the new hardware resource will be described as an example. The finisher performs a process of classifying sheets of paper on which images are formed by the image forming unit 140 into a plurality of groups, a process of stapling sheets, a process of punching holes and the like. Similarly to the operation panel 190, the automatic document feeder 120, the document scanning unit 130, the image forming unit 140 and the paper feed unit 150, the finisher also includes a CPU, a ROM, a RAM and a flash memory.

FIG. 6 is a diagram showing one example of the changed activation factor table. Referring to FIG. 6, in the changed activation factor table, the hardware identification information "FINISHER" of the finisher is added to the activation factor table shown in FIG. 5 as the hardware resource corresponding to each of the state identification information "STATE A" and the state identification information "STATE D".

In response to reception of a set of the activation factor identification information and the address information from the snapshot production portion 61, the association portion 63 produces a snapshot definition record and adds the snapshot definition record to a snapshot definition table stored in the flash memory 23 for storage. The snapshot definition record includes an item of the activation factor and an item of the address information. The activation factor identification information is set in the item of the activation factor, and the address information indicating a position in the flash memory 23 where a snapshot corresponding to the activation factor identified by the activation factor identification information is stored is set in the item of the address information.

FIG. 7 is a diagram showing one example of the snapshot definition table. Referring to FIG. 7, the snapshot definition table includes a snapshot definition record for each of the plurality of activation factors. The snapshot definition record includes the item of the activation factor and the item of the address information. The activation factor identification information is set in the item of the activation factor, and the address information indicating a position in the flash memory 23 where a snapshot corresponding to the activation factor identified by the activation factor identification information is stored is set in the item of the address information.

When being activated by the activating CPU 13, the recovery portion 55 reads out a snapshot, which is associated with the activation factor, among one or more snapshots stored in the flash memory 23 with reference to the snapshot definition table stored in the flash memory 23, and stores the read snapshot in the RAM 21. After storing the snapshot in the RAM 21, the recovery portion 55 outputs an activation completion signal to the main mode switch portion 53.

Specifically, in the case where power is supplied to the recovery portion 55 from the power supply control circuit 17 and then the recovery portion 55 receives the reset signal from the activating CPU 13, the recovery portion 55 executes a boot program stored in the flash memory 23. This boot program defines the address information indicating a position in the flash memory 23 of any of the one or more snapshots stored in the flash memory 23. As described below, the address information of the snapshot defined by the boot program is overwritten by the activating CPU 13. The recovery portion 55 reads out the snapshot specified by the address information defined by the boot program and stores the snapshot in the RAM 21. Thus, the snapshot is stored in the RAM 21 as an execution program, so that the CPU 11 can execute the execution program.

When receiving the activation completion signal from the recovery portion 55, the main mode switch portion 53 set an operation mode to a driving mode. The driving mode is the operation mode in which power is supplied to the main CPU 11 from the power supply control circuit 17, and a stop mode is the operation mode in which power is not supplied to the main CPU 11 from the power supply control circuit 17. The main CPU 11 is driven by power supplied from the power supply control circuit 17 in the case where the operation mode is the driving mode, and is not driven because power is not supplied from the power supply control circuit 17 in the case where the operation mode is the stop mode. The main mode switch portion 53 switches the operation mode from the driving mode to the stop mode at the predetermined time. The time at which the main mode switch portion 53 switches the operation mode from the driving mode to the stop mode can be arbitrarily determined. While the invention is not limited to this, it includes the case where an operation is continuously not input to the operation panel 190 in a predetermined time period, and the case where the image forming unit 140 is continuously not driven in a predetermined time period, for example. In the case where switching the operation mode from the driving mode to the stop mode, the main mode switch portion 53 outputs a switch signal to the activating CPU 13.

The main mode switch portion 53 includes a post-execution switch portion 59. In the case where the activation factor of the activation of the main CPU 11 by the recovery portion 55 is a predetermined activation factor, the CPU 11 executes an execution program stored in the RAM 21, and a series of processes based on the activation factor ends. Thereafter, the post-execution switch portion 59 switches the operation mode from the driving mode to the stop mode. The predetermined activation factors are the activation factors of operations other than the operations of the MFP 100 directly performed by the user, and are, in this case, the activation factor of the activation factor identification information "FACSIMILE INCOMING CALL" and the activation factor of the activation factor identification information "DATA RECEPTION".

Figure 8:
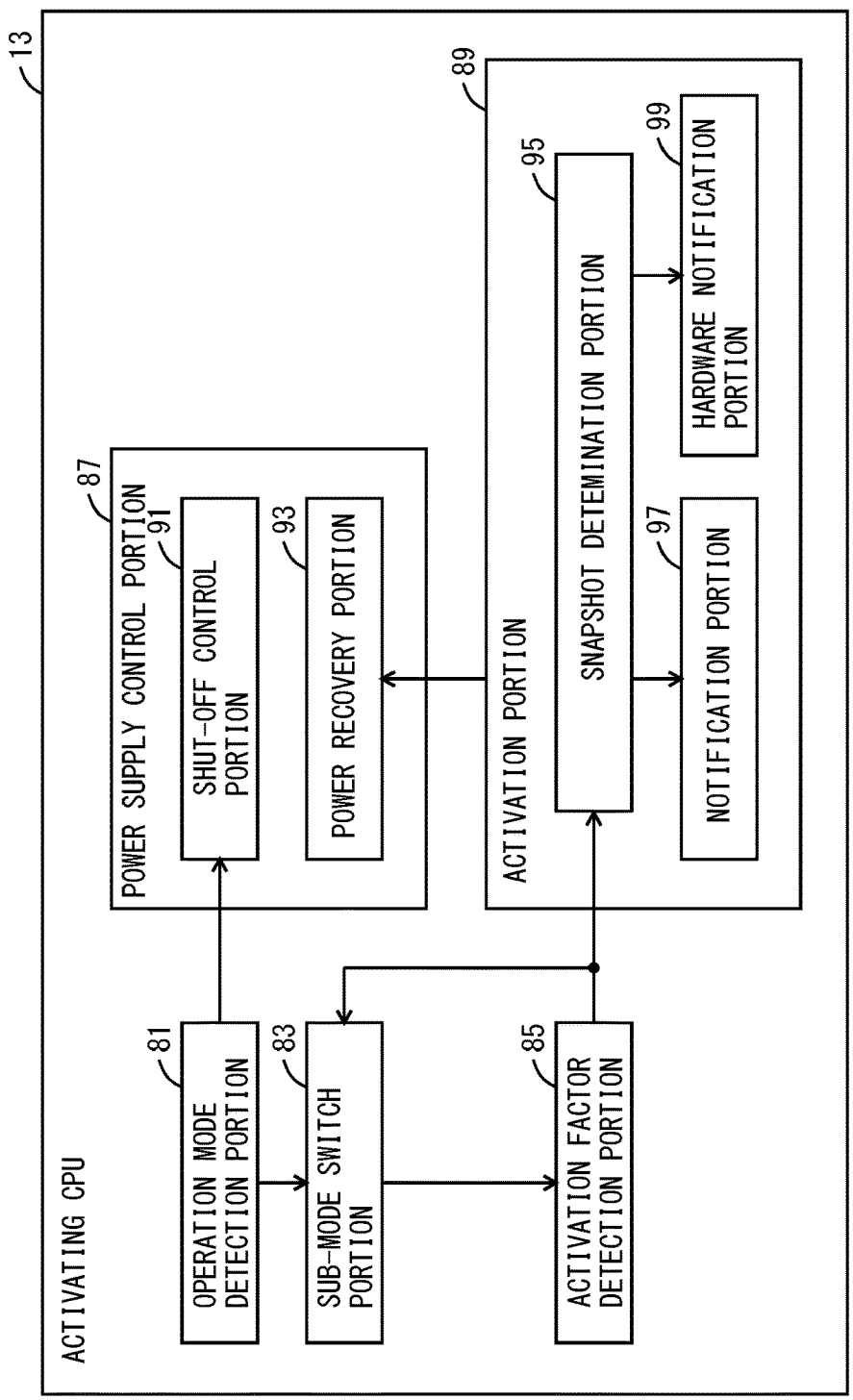
FIG. 8 is a block diagram showing one example of functions of an activating CPU.

FIG. 8 is a block diagram showing one example of functions of the activating CPU 13. The functions shown in FIG. 8 are the functions formed in the activating CPU 13 in the case where the activating CPU 13 executes a sub-activation control program. The sub-activation control program is part of the activation control program. Referring to FIG. 8, the activating CPU 13 includes an operation mode detection portion 81, a sub-mode switch portion 83, an activation factor detection portion 85, a power supply control portion 87 and an activation portion 89.

The operation mode detection portion 81 detects switching of the operation modes of the main CPU 11. When receiving the switch signal from the main CPU 11, the operation mode detection portion 81 detects that the main CPU 11 has switched the operation mode from the driving mode to the stop mode. In the case where detecting that the main CPU 11 has switched the operation mode from the driving mode to the stop mode, the operation mode detection portion 81 outputs a switch instruction to the power supply control portion 87 and the sub-mode switch portion 83.

The sub-mode switch portion 83 switches the operation mode to any of a normal mode, and a power saving mode in which power consumption is lower than power consumption in the normal mode. In response to reception of the switch instruction from the operation mode detection portion 81, the sub-mode switch portion 83 switches the operation mode from the normal mode to the power saving mode. In the case where switching the operation mode from the normal mode to the power saving mode, the sub-mode switch portion 83 outputs a detection instruction to the activation factor detection portion 85.

When receiving the detection instruction from the sub-mode switch portion 83, the activation factor detection portion 85 detects an activation factor. Specifically, the activation factor detection portion 85 detects a voltage of each of the key terminal of the panel connector 31, the switch terminal of the ADF connector 32, the incoming call notification terminal of the FAX connector 33 and the reception notification terminal of the communication connector 34, and detects an activation factor when a voltage of any of these terminals is changed from LOW to HIGH. When detecting the activation factor, the activation factor detection portion 85 outputs terminal identification information, for identifying the terminal of which the voltage is changed from LOW to HIGH, to the activation portion 89 and the sub-mode switch portion 83.

In the power saving mode, in response to reception of the terminal identification information from the activation factor detection portion 85, that is, in response to a change of a voltage of any of the key terminal of the panel connector 31, the switch terminal of the ADF connector 32, the incoming call notification terminal of the FAX connector 33 and the reception notification terminal of the communication connector 34 from LOW to HIGH, the sub-mode switch portion 83 switches the operation mode from the power saving mode to the normal mode.

After the operation mode is switched to the power saving mode by the sub-mode switch portion 83, the activating CPU 13 operates in a so-called HALT mode in which a program is not executed until the operation mode is switched to the normal mode. In the power saving mode, the activating CPU 13 performs only a process of detecting a voltage of each of the key terminal of the panel connector 31, the switch terminal of the ADF connector 32, the incoming call notification terminal of the FAX connector 33 and the reception notification terminal of the communication connector 34. In other words, in the power saving mode, the activating CPU 13 only enables the activation factor detection portion 85 to operate. Therefore, in the power saving mode, the activating CPU 13 can reduce the power consumption to be smaller than the power consumption in the normal mode.

During a period in which the main CPU 11 switches the operation mode from the driving mode to the stop mode, in response to detection of the activation factor by the activation factor detection portion 85, the activation portion 89 activates the main CPU 11. Specifically, the activation portion 89 activates the main CPU 11 by outputting the reset signal to the reset terminal of the main CPU 11. The activation portion 89 includes a snapshot determination portion 95, a notification portion 97 and a hardware notification portion 99.

In response to reception of the terminal identification information from the activation factor detection portion 85, the snapshot determination portion 95 determines the activation factor and outputs the activation factor identification information of the determined activation factor to the hardware notification portion 99. Further, the snapshot determination portion 95 outputs the address information of the snapshot corresponding to the determined activation factor to the notification portion 97 with reference to the snapshot definition table stored in the flash memory 23.

Specifically, in the case where receiving the terminal identification information of the key terminal of the panel connector 31, the snapshot determination portion 95 determines the activation factor of the activation factor identification information "PANEL KEY" as the corresponding activation factor. The snapshot determination portion 95 determines a snapshot, which is stored at the address information "ADDRESS A" corresponding to the activation factor identification information "PANEL KEY" of the determined activation factor, as the corresponding snapshot with reference to the snapshot definition table stored in the flash memory 23, and outputs the address information "ADDRESS A" to the notification portion 97.

In the case where receiving the terminal identification information of the switch terminal of the ADF connector 32, the snapshot determination portion 95 determines the activation factor of the activation factor identification information "DOCUMENT PLACEMENT" as the corresponding activation factor. The snapshot determination portion 95 determines a snapshot, which is stored at the address information "ADDRESS B" corresponding to the activation factor identification information "DOCUMENT PLACEMENT" of the determined activation factor, as the corresponding snapshot with reference to the snapshot definition table stored in the flash memory 23, and outputs the address information "ADDRESS B" to the notification portion 97.

In the case where receiving the terminal identification information of the incoming call notification terminal of the FAX connector 33, the snapshot determination portion 95 determines the activation factor of the activation factor identification information "FACSIMILE INCOMING CALL" as the corresponding activation factor. The snapshot determination portion 95 determines a snapshot, which is stored at the address information "ADDRESS C" corresponding to the activation factor identification information "FACSIMILE INCOMING CALL" of the determined activation factor, as the corresponding snapshot with reference to the snapshot definition table stored in the flash memory 23, and outputs the address information "ADDRESS C" to the notification portion 97.

In the case where receiving the terminal identification information of the reception notification terminal of the communication connector 34, the snapshot determination portion 95 determines the activation factor of the activation factor identification information "DATA RECEPTION" as the corresponding activation factor. The snapshot determination portion 95 determines a snapshot stored at the address information "ADDRESS D" corresponding to the activation factor identification information "DATA RECEPTION" of the determined activation factor as the corresponding snapshot with reference to the snapshot definition table stored in the flash memory 23, and outputs the address information "ADDRESS D" to the notification portion 97.

In response to reception of address information from the snapshot determination portion 95, the notification portion 97 notifies the main CPU 11 of a snapshot. Specifically, the notification portion 97 overwrites the read address defined in the boot program stored in the flash memory 23 with the address information received from the snapshot determination portion 95. After the notification portion 97 overwrites the boot program, the activation portion 89 outputs a power supply instruction to the power supply control portion 87 and outputs the reset signal to the reset terminal of the main CPU 11. The power supply instruction includes the activation factor identification information of the activation factor.

The hardware notification portion 99 determines hardware resources corresponding to the activation factor specified by the activation factor identification information received from the snapshot determination portion 95 with reference to the activation factor table stored in the flash memory, and outputs an activation instruction to each of the determined hardware resources.

Specifically, in the case where receiving the activation factor identification information "PANEL KEY" from the snapshot determination portion 95, the hardware notification portion 99 outputs the activation instruction to each of the operation panel 190, the document scanning unit 130, the image forming unit 140, the paper feed unit 150, the automatic document feeder 120, the facsimile unit 170 and the communication I/F unit 160. In the case where receiving the activation factor identification information "DOCUMENT PLACEMENT" from the snapshot determination portion 95, the hardware notification portion 99 outputs the activation instruction to each of the operation panel 190, the document scanning unit 130, the automatic document feeder 120 and the HDD 113. In the case where receiving the activation factor identification information "FACSIMILE INCOMING CALL" from the snapshot determination portion 95, the hardware notification portion 99 outputs the activation instruction to each of the image forming unit 140, the paper feed unit 150 and the facsimile unit 170. In the case where receiving the activation factor identification information "DATA RECEPTION" from the snapshot determination portion 95, the hardware notification portion 99 outputs the activation instruction to each of the image forming unit 140, the paper feed unit 150 and the communication I/F unit 160.

The power supply control portion 87 controls the power supply control circuit 17 to switch the power supply to the main CPU 11, the RAM 21, the flash memory 23, the operation panel 190, the document scanning unit 130, the image forming unit 140, the paper feed unit 150, the automatic document feeder 120, the facsimile unit 170, the communication I/F unit 160, the HDD 113 and the external storage device 115. The power supply control portion 87 includes a shut-off control portion 91 and a power recovery portion 93. In response to reception of the switch instruction from the operation mode detection portion 81, the shut-off control portion 91 allows the power supply control circuit 17 to shut off the power supply to the main CPU 11, the RAM 21, the flash memory 23, the operation panel 190, the document scanning unit 130, the image forming unit 140, the paper feed unit 150, the automatic document feeder 120, the facsimile unit 170, the communication I/F unit 160, the HDD 113 and the external storage device 115. Thus, because the power supply control circuit 17 does not supply power to the main CPU 11, the RAM 21, the flash memory 23, the operation panel 190, the document scanning unit 130, the image forming unit 140, the paper feed unit 150, the automatic document feeder 120, the facsimile unit 170, the communication I/F unit 160, the HDD 113 and the external storage device 115, the power consumption can be reduced. Although the activating CPU 13 is driven by power supplied from the power supply control circuit 17, in the case where the operation mode is switched to the power saving mode, the power consumed by the activating CPU 13 is smaller than the power consumed in the normal mode.

In response to reception of the power supply instruction from the activation portion 89, the power recovery portion 93 allows the power supply control circuit 17 to supply power to the main CPU 11, the RAM 21 and the flash memory 23. Thus, the main CPU 11, the RAM 21 and the flash memory 23 are driven. When receiving power from the power supply control circuit 17 and receiving the reset signal from the activating CPU 13, the main CPU 11 executes the boot program stored in the flash memory 23. Because the read address of this boot program is overwritten by the above-mentioned notification portion 97, the snapshot determined by the snapshot determination portion 95, in other words, the snapshot corresponding to the activation factor is read from the flash memory 23 and stored in the RAM 21.

Further, the power recovery portion 93 determines hardware resources corresponding to an activation factor specified by the activation factor identification information included in the power supply instruction, and allows the power supply control circuit 17 to supply power to the determined hardware resources. The power recovery portion 93 determines hardware resources corresponding to the activation factor from among the operation panel 190, the document scanning unit 130, the image forming unit 140, the paper feed unit 150, the automatic document feeder 120, the facsimile unit 170, the communication I/F unit 160, the HDD 113 and the external storage device 115, which are the hardware resources, with reference to the activation factor table stored in the flash memory 23.

Specifically, in the case where the activation factor identification information "PANEL KEY" is included in the power supply instruction, the power recovery portion 93 controls the power supply control circuit 17 to supply power to each of the operation panel 190, the document scanning unit 130, the image forming unit 140, the paper feed unit 150, the automatic document feeder 120, the facsimile unit 170, the communication I/F unit 160, the HDD 113 and the external storage device 115.

In the case where the activation factor identification information "DOCUMENT PLACEMENT" is included in the power supply instruction, the power recovery portion 93 controls the power supply control circuit 17 to supply power to each of the operation panel 190, the document scanning unit 130, the automatic document feeder 120 and the HDD 113.

In the case where the activation factor identification information "FACSIMILE INCOMING CALL" is included in the power supply instruction, the power recovery portion 93 controls the power control circuit 17 to supply power to each of the image forming unit 140, the paper feed unit 150 and the facsimile unit 170.

In the case where the activation factor identification information "DATA RECEPTION" is included in the power supply instruction, the power recovery portion 93 controls the power supply control circuit 17 to supply power to each of the image forming unit 140, the paper feeder 150 and the communication I/F unit 160.

Figure 9:
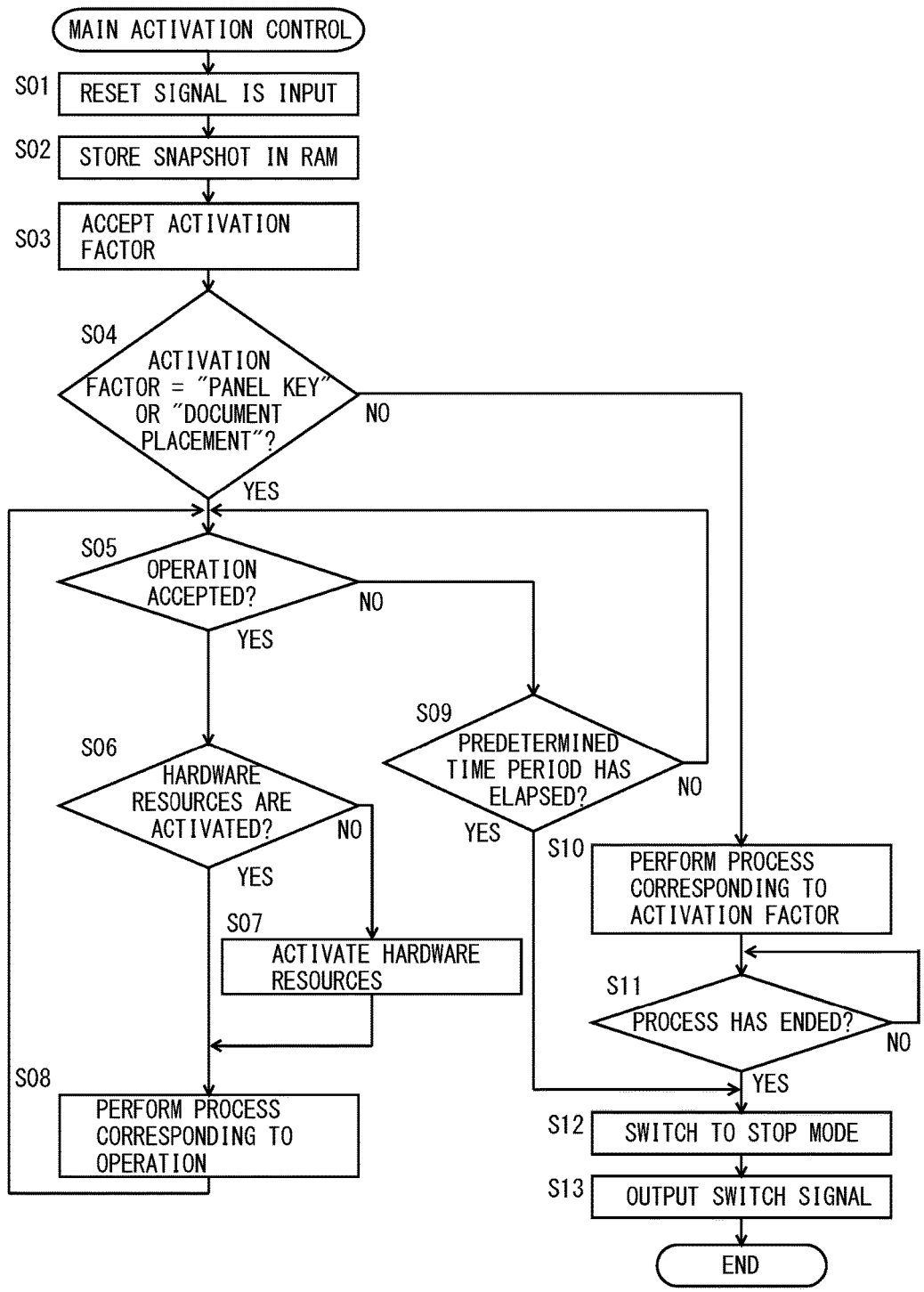
FIG. 9 is a flow chart showing one example of a flow of a main activation control process.

FIG. 9 is a flow chart showing one example of a flow of a main activation control process. The main activation control process is a process executed by the main CPU 11 in the case where the main CPU 11 executes a main activation control program. The main activation control program is part of the activation control program. Referring to FIG. 9, the main CPU 11 receives the reset signal (step S01). The activating CPU 13 outputs the reset signal to the reset terminal of the main CPU 11. When receiving the reset signal, the main CPU 11 stores a snapshot in the RAM 21. Specifically, the main CPU 11 executes the boot program stored in the flash memory 23. The main CPU 11 reads out the snapshot specified by the address information defined by the boot program from among the plurality of snapshots stored in the flash memory 23 and stores the snapshot in the RAM 21.

In the next step S03, an activation factor is accepted, and the process proceeds to the step S04. In the step S01, the case where the reset signal is input by the activating CPU 13 is the case where the activation factor is detected by the activating CPU 13, and the main CPU 11 accepts the activation factor.

In the step S04, whether the activation actor is any of the activation factor identification information "PANEL KEY" and the activation factor identification information "DOCUMENT PLACEMENT" is determined. If the activation factor is any of the activation factor identification information "PANEL KEY" and the activation factor identification information "DOCUMENT PLACEMENT", the process proceeds to the step S05. If not, the process proceeds to the step S10.

The process proceeds to the step S05 in the case where the activation factor is the activation factor of the activation factor identification information "PANEL KEY". In this case, because the snapshot stored in the RAM 21 in the step S02 is the data stored in the RAM 21 with the operation panel 190, the document scanning unit 130, the image forming unit 140, the paper feed unit 150, the automatic document feeder 120, the facsimile unit 170, the communication OF unit 160, the HDD 113 and the external storage device 115 receiving power from the power supply control circuit 17 and driven, the main CPU 11 can accept an operation of the user that is input to the operation panel 190 and perform a process corresponding to the accepted operation.

The process proceeds to the step S05 in the case where the activation factor is the activation factor of the activation factor identification information "DOCUMENT PLACEMENT". In this case, because the snapshot stored in the RAM 21 in the step S02 is the data stored in the RAM 21 with the operation panel 190, the document scanning unit 130, the automatic document feeder 120 and the HDD 113 from the power supply control circuit 17 receiving power from the power supply control circuit 17 and driven, the main CPU 11 can accept an operation, of giving an instruction to scan a document, which is input to the operation panel 190, and perform a process of allowing the HDD 113 to store the image, which is scanned by the document scanning unit, of the document placed on the automatic document feeder 120.

In the step S05, whether an operation is accepted is determined. An operation of inputting an operation to the operation unit 196 by the user is accepted. If the operation is accepted, the process proceeds to the step S06. If not, the process proceeds to the step S09. In the step S06, whether hardware resources for performing a process corresponding to the accepted operation are activated is determined. If the hardware resources are activated, the process proceeds to the step S08. If not, the process proceeds to the step S07. In the step S07, the main CPU 11 activates the hardware resources, and the process proceeds to the step S08. In the step S08, the process is performed in accordance with the accepted operation, and the process returns to the step S05.

In the step S09, whether a predetermined time period has elapsed without acceptance of an operation is determined. If the predetermined time period has elapsed without acceptance of an operation, the process proceeds to the step S12. If not, the process returns to the step S05.

In the step S10, a process corresponding to an activation factor is performed. Specifically, in the case where the activation factor of the activation factor identification information "FACSIMILE INCOMING CALL" is accepted in the step S03, the main CPU 11 performs a process of receiving a facsimile. Because the snapshot stored in the RAM 21 in the step S02 is the data stored in the RAM 21 with the image forming unit 140, the paper feed unit 150 and the facsimile unit 170 receiving power from the power supply control circuit 17 and driven, the main CPU 11 can control the image forming unit 140, the paper feed unit 150 and the facsimile unit 170. Therefore, the main CPU 11 can allow the facsimile unit 170 to receive the facsimile data, and can allow the image forming unit 140 to form an image of the facsimile data on a sheet of paper supplied from the paper feed unit 150.

Further, in the case where the activation factor "DATA RECEPTION" is accepted in the step S03, the main CPU 11 performs a process of receiving data. Because the snapshot stored in the RAM 21 in the step S02 is the data stored in the RAM 21 with the image forming unit 140, the paper feed unit 150 and the communication I/F unit 160 receiving power from the power supply control circuit 17 and driven, the main CPU 11 can control the image forming unit 140, the paper feed unit 150 and the communication I/F unit 160. Therefore, the main CPU 11 can allow the communication I/F unit 160 to receive data. If the received data is print data, the main CPU 11 can allow the image forming unit 140 to form an image of the print data on a sheet of paper supplied from the paper feed unit 150.

In the step S11, whether a process corresponding to an activation factor has ended is determined. The process waits until the process ends (NO in the step S11). If the process ends (YES in the step S11), the process proceeds to the step S12. In the step S12, the operation mode is switched to the stop mode. Thus, the power consumed by the hardware resources controlled by the CPU 11 is reduced. In the next step S13, the main CPU 11 outputs the switch signal to the activating CPU 13, and the process ends.

Figure 10:
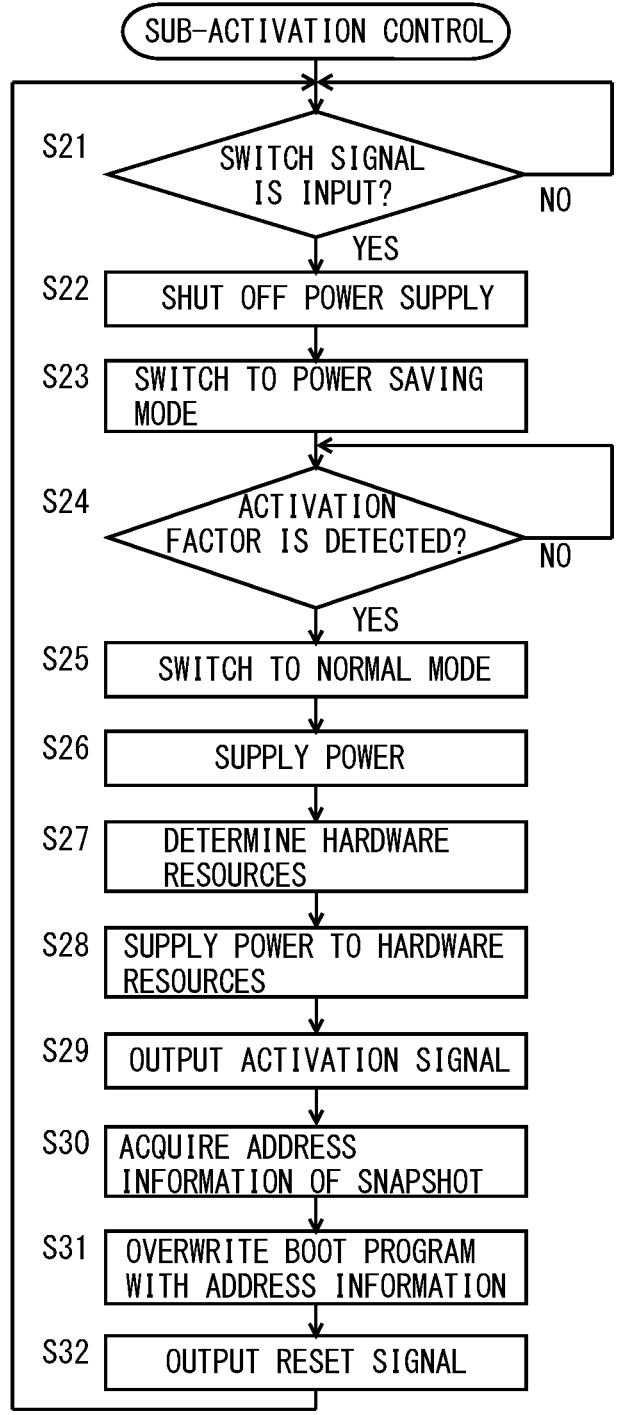
FIG. 10 is a flow chart showing one example of a flow of a sub-activation control process.

FIG. 10 is a flow chart showing one example of a flow of a sub-activation control process. The sub-activation control process is a process executed by the activating CPU 13 in the case where the activating CPU 13 executes a sub-activation control program. The sub-activation control program is part of the activation control program.

Referring to FIG. 10, the activating CPU 13 determines whether the switch signal is input from the main CPU 11 (step S21.). The process waits until the switch signal is input (NO in the step S21). If the switch signal is input (YES in the step S21), the process proceeds to the step S22.

In the step S22, the power supply is shut off. Specifically, the activating CPU 13 allows the power supply control circuit 17 to shut off the power supply to the main CPU 11, the RAM 21, the flash memory 23, the operation panel 190, the document scanning unit 130, the image forming unit 140, the paper feed unit 150, the automatic document feeder 120, the facsimile unit 170, the communication I/F unit 160, the HDD 113 and the external storage device 115. Thus, the power consumed by the main CPU 11, the RAM 21, the flash memory 23, the operation panel 190, the document scanning unit 130, the image forming unit 140, the paper feed unit 150, the automatic document feeder 120, the facsimile unit 170, the communication I/F unit 160, the HDD 113 and the external storage device 115 can be reduced.

In the next step S23, the operation mode is switched from the normal mode to the power saving mode. After the operation mode is switched to the power saving mode, the activating CPU 13 operates in the so-called HALT mode in which a program is not executed until the operation mode is switched to the normal mode. In the power saving mode, the activating CPU 13 performs only a process of detecting a voltages of each of the key terminal of the panel connector 31, the switch terminal of the ADF connector 32, the facsimile incoming call notification terminal of the FAX connector 33 and the reception notification terminal of the communication connector 34. Therefore, the activating CPU 13 can reduce the power consumption in the power saving mode to be smaller than the power consumption in the normal mode.

In the next step S24, whether the activation factor has been detected is determined. The process waits until the activation factor is detected (NO in the step S24). If the activation factor is detected (YES in the step S24), the process proceeds to the step S25. Specifically, in the case where the voltage of the key terminal of the panel connector 31 is changed from LOW to HIGH, the activating CPU 13 detects the activation factor of the activation factor identification information "PANEL KEY". In the case where the voltage of the switch terminal of the ADF connector 32 is changed from LOW to HIGH, the activating CPU 13 detects the activation factor of the activation factor identification information "DOCUMENT PLACEMENT". In the case where the voltage of the facsimile incoming call notification terminal of the FAX connector 33 is changed from LOW to HIGH, the activating CPU 13 detects the activation factor of the activation factor identification information "FACSIMILE INCOMING CALL". In the case where the voltage of the reception notification terminal of the communication connector 23 is changed from LOW to HIGH, the activating CPU 13 detects the activation factor of the activation factor identification information "DATA RECEPTION".

In the step S25, the operation mode is switched to the normal mode. Then, power is supplied to the main CPU 11, the RAM 21 and the flash memory 23 (step S26). Specifically, the activating CPU 13 controls the power supply control circuit 17 and allows the power supply control circuit 17 to supply power to the main CPU 11, the RAM 21 and the flash memory 23.

In the next step S27, hardware resources corresponding to an activation factor are determined. The activating CPU 13 determines the hardware resources corresponding to the activation factor detected in the step S24 with reference to the activation factor table stored in the flash memory 23. In the case where the activation factor of the activation factor identification information "PANEL KEY" is detected in the step S24, the operation panel 190, the document scanning unit 130, the image forming unit 140, the paper feed unit 150, the automatic document feeder 120, the facsimile unit 170, the communication I/F unit 160, the HDD 113 and the external storage device 115 are determined as the hardware resources. In the case where the activation factor of the activation factor identification information "DOCUMENT PLACEMENT" is detected in the step S24, the operation panel 190, the document scanning unit 130, the automatic document feeder 120 and the HDD 113 are determined as the hardware resources. Further, in the case where the activation factor of the activation factor identification information "FACSIMILE INCOMING CALL" is detected in the step S24, the image forming unit 140, the paper feed unit 150 and the facsimile unit 170 are determined as the hardware resources. In the case where the activation factor identification information "DATA RECEPTION" is accepted in the step S24, the image forming unit 140, the paper feed unit 150 and the communication I/F unit 160 are determined as the hardware resources.

In the step S28, power is supplied to the hardware resources determined in the step S27. Specifically, the activating CPU 13 controls the power supply control circuit 17 and allows the power supply control circuit 17 to supply power to the hardware resources. Then, an activation signal is output to each of the hardware resources determined in the step S27 (step S29), and the process proceeds to the step S30.

In the step S30, the activation CPU 13 acquires the address information of the snapshot corresponding to the activation factor detected in the step S24. Specifically, the activating CPU 13 acquires the address information indicating a position where the snapshot corresponding to the activation factor detected in the step S24 is stored in the flash memory 23 with reference to the snapshot definition table stored in the flash memory 23. More specifically, the address information "ADDRESS A" is acquired in the case where the activation factor of the activation factor identification information "PANEL KEY" is detected, the address information "ADDRESS B" is acquired in the case where the activation factor identification information "DOCUMENT PLACEMENT" is detected, the address information "ADDRESS C" is acquired in the case where the activation factor "FACSIMILE INCOMING CALL" is detected, and the address information "ADDRESS D" is acquired in the case where the activation factor "DATA RECEPTION" is detected.

In the next step S31, the activating CPU 31 overwrites the address information of the boot program of the main CPU 11. Specifically, the read address defined by the boot program stored in the flash memory 23 is overwritten with the address information acquired in the step S30. Then, the activating CPU 31 outputs the reset signal to the reset terminal of the main CPU 11 (step S32), and the process returns to the step S21.

While the snapshot acquisition portion 51 is provided in the main CPU 11 in the present embodiment, the snapshot acquisition portion 51 may be provided in the activating CPU 13.

MODIFIED EXAMPLE

In the MFP 100 in the above-mentioned embodiment, the main CPU 11 loads all programs installed in the MFP 100 into the RAM 21 and then produces a snapshot for each of the plurality of states. An MFP 100 in the modified example is different from the MFP 100 in the above-mentioned embodiment in that, the main CPU 11, in a predetermined state, loads part of the programs installed in the MFP 100 into the RAM 21 and produces a snapshot.

In the MFP 100 in the modified example, the main CPU 11 loads one or more programs from among the plurality of programs stored in the flash memory 23 into the RAM 21 for execution. The main CPU 11 can also load all of the plurality of programs stored in the flash memory 23 into the RAM 21 for execution. The plurality of programs stored in the flash memory 23 include a hardware control program for respectively controlling a plurality of hardware resources and an overall control program for controlling the entire MFP 100. The hardware control program includes a panel control program for controlling the operation panel 190, a scanner control program for controlling the document scanning unit 130, an engine control program for controlling the image forming unit 140, a transport control program for controlling the paper feed unit 150, an ADF control program for controlling the automatic document feeder 120, a facsimile control program for controlling the facsimile unit 170 and a communication control program for controlling the communication I/F unit 160. Programs for controlling the HDD 113 and the external storage device 115 are included in the overall control program.

Figure 11:
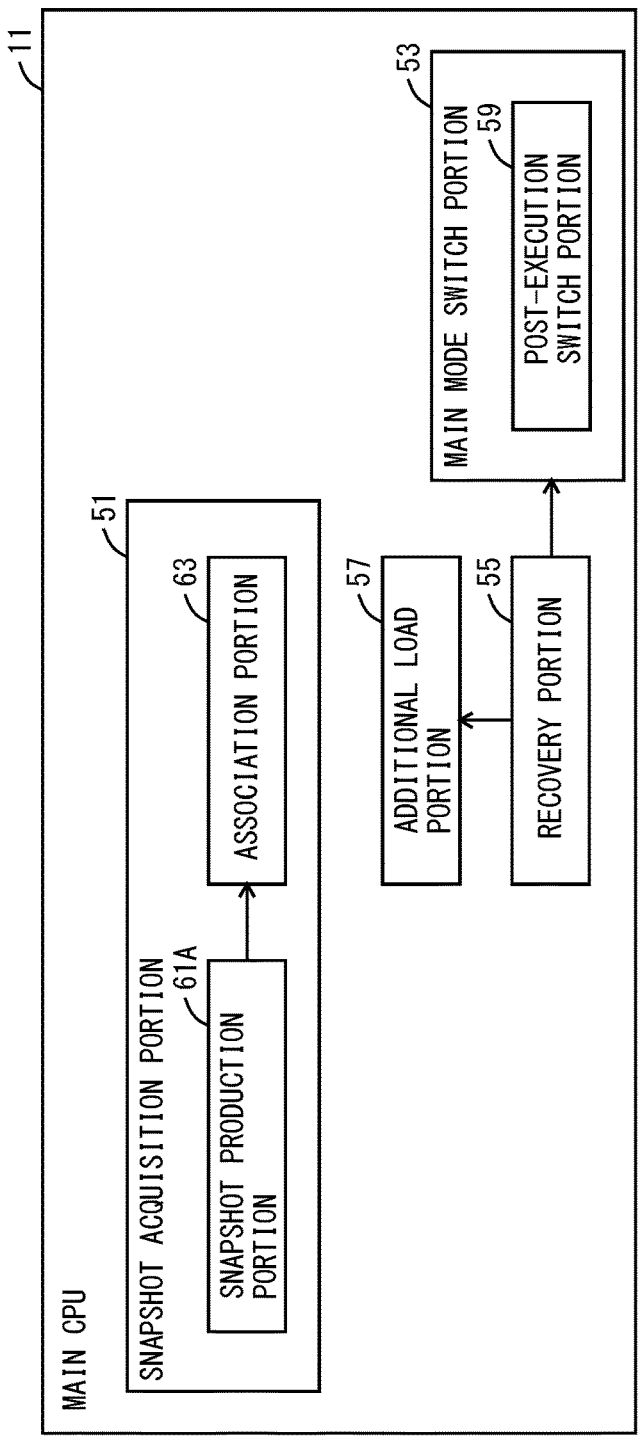
FIG. 11 is a block diagram showing one example of functions of a main CPU in a modified example.

FIG. 11 is a block program showing one example of functions of the main CPU in the modified example. Referring to FIG. 11, differences from the functions shown in FIG. 4 are that an additional load portion 57 is added, and that the snapshot production portion 61 is changed to a snapshot production portion 61A. The other functions are the same as the functions shown in FIG. 4. A description therefore will not be repeated.

The snapshot production portion 61A loads one or more programs defined for the activation factor into the RAM 21 for each of the plurality of activation factors. Thus, one or more execution programs respectively corresponding to the one or more programs defined for the activation factor are stored in the RAM 21. The snapshot production portion 61A stores the execution programs, which are stored in the RAM 21, in the flash memory 23 as a snapshot, which is image data. Therefore, the snapshot production portion 61A stores a plurality of snapshots respectively corresponding to a plurality of activation factors in the flash memory 23. The snapshot production portion 61A outputs an activation factor and an address in the flash memory 23 of a snapshot stored in the flash memory 23 corresponding to the activation factor to the association portion 63.

Specifically, an activation factor table that associates activation factors with programs is stored in advance in the flash memory 23, and the snapshot production portion 61 stores a snapshot in the flash memory 23 with reference to the activation factor table.

FIG. 12 is a diagram showing one example of the activation factor table in the modified example. Referring to FIG. 12, the activation factor table in the modified example includes an activation factor record for each of the plurality of activation factors. The activation factor record includes an item of the activation factor, an item of the hardware resource and an item of the program. The activation factor identification information for identifying the activation factor is set in the item of the activation factor, the hardware identification information for identifying the hardware resource is set in the item of the hardware resource, and the program identification information for identifying the program is set in the item of the program.

As for the activation factor record in which the activation factor identification information "PANEL KEY" is set in the item of the activation factor, the pieces of hardware identification information "OPERATION PANEL", "DOCUMENT SCANNING UNIT", "IMAGE FORMING UNIT", "PAPER FEED UNIT", "AUTOMATIC DOCUMENT FEEDER", "FACSIMILE UNIT", "COMMUNICATION I/F UNIT", "HDD" and "EXTERNAL STORAGE DEVICE" are set in the item of the hardware resource, and the pieces of program identification information "PANEL CONTROL PROGRAM", "SCANNER CONTROL PROGRAM", "ENGINE CONTROL PROGRAM", "TRANSPORT CONTROL PROGRAM", "ADF CONTROL PROGRAM", "FACSIMILE CONTROL PROGRAM", "COMMUNICATION CONTROL PROGRAM" and "OVERALL CONTROL PROGRAM" are set in the item of the program. As for the activation factor record in which the activation factor identification information "PANEL KEY" is set, the pieces of program identification information of all of the programs installed in the MFP 100 are included in the item of the program. In other words, all of the programs installed in the MFP 100 are associated with the activation factor of the activation factor identification information "PANEL KEY".

As for the activation factor record in which the activation factor identification information "DOCUMENT PLACEMENT" is set in the item of the activation factor, the pieces of hardware identification information "OPERATION PANEL", "DOCUMENT SCANNING UNIT", "AUTOMATIC DOCUMENT FEEDER", "FACSIMILE UNIT", "COMMUNICATION I/F UNIT" and "HDD" are set in the item of the hardware resource. The pieces of program identification information "PANEL CONTROL PROGRAM", "SCANNER CONTROL PROGRAM", "ADF CONTROL PROGRAM" and "OVERALL CONTROL PROGRAM" are set in the item of the program.

As for the activation factor record in which the activation factor identification information "FACSIMILE INCOMING CALL" is set in the item of the activation factor, the pieces of hardware identification information "IMAGE FORMING UNIT", "PAPER FEED UNIT" and "FACSIMILE UNIT" are set in the item of the hardware resource, and the pieces of program identification information "ENGINE CONTROL PROGRAM", "TRANSPORT CONTROL PROGRAM", "FACSIMILE CONTROL PROGRAM" and "OVERALL CONTROL PROGRAM" are set in the item of the program.

As for the activation factor record in which the activation factor identification information "DATA RECEPTION" is set in the item of the activation factor, the pieces of hardware identification information "IMAGE FORMING UNIT", "PAPER FEED UNIT" and "COMMUNICATION OF UNIT" are set in the item of the hardware resource, and the pieces of program identification information "ENGINE CONTROL PROGRAM", "TRANSPORT CONTROL PROGRAM", "COMMUNICATION CONTROL PROGRAM" and "OVERALL CONTROL PROGRAM" are set in the item of the program.

Returning to FIG. 11, the snapshot production portion 61A resets the RAM 21 and loads only a snapshot production program corresponding to the snapshot production portion 61A into the RAM 21. For example, the snapshot production program is stored in advance in the flash memory 23, and then the read address, of the program defined by the boot program stored in the flash memory 23, is changed to the address at which the snapshot production program is stored. Thereafter, the snapshot production portion 61A resets the RAM 21 and the main CPU 11. In the stage where the main CPU 11 is reset, only the snapshot production portion 61A is formed in the main CPU 11.

The snapshot production portion 61A reads out an activation factor record from the activation factor table stored in the flash memory 23 and loads only a program, which is set in the item of the program of the read activation factor record, into the RAM 21. A process of determining an activation factor record to be read from among the plurality of activation factor records included in the activation factor table by the snapshot production portion 61A will be described below. Then, the snapshot production portion 61A stores the data, which is stored in the RAM 21, in the flash memory 23 as a snapshot, which is image data. The snapshot production portion 61A outputs a set, of the activation factor identified by the activation factor identification information set in the item of the activation factor of the read activation factor record and the address information indicating a position in the flash memory 23 of the snapshot stored in the flash memory 23, to the association portion 63.

With reference to the snapshot definition table and the activation factor table stored in the flash memory 23, the snapshot production portion 61A reads out the activation factor record in which the activation factor identification information, of the activation factor that is not set in any of the one or more snapshot definition records included in the snapshot definition table, is set in the item of the activation factor from the activation factor table.

The activation factor table is changed in the case where a hardware resource is added to the MFP 100 or deleted from the MFP 100. In the case where a new hardware is added to the MFP 100 or a hardware is deleted from the MFP 100, the snapshot production portion 61A produces a snapshot and stores the snapshot in the flash memory 23. Specifically, in the case where a new hardware resource is added to the MFP 100 or a hardware resource is deleted from the MFP 100, the snapshot production portion 61A initializes the snapshot definition table. Thereafter, with reference to the snapshot definition table and the activation factor table stored in the flash memory 23, the snapshot production portion 61A reads out the activation factor record in which the activation factor identification information, of the activation factor that is not set in any of the one or more snapshot definition records included in the snapshot definition table, is set in the item of the activation factor from the activation factor table, and then stores a snapshot in the flash memory 23 by loading only a program, which is set in the item of the program of the read activation factor record, into the RAM 21.

The snapshot acquisition portion 51 may download a snapshot from a predetermined server. In this case, the snapshot production portion 61A is not necessary. In the server, a plurality of snapshots compatible with the same model as the main CPU 11 included in the MFP 100 are stored in advance in association with the activation factors. The snapshot acquisition portion 51 downloads sets of an activation factor and a snapshot corresponding to the activation factor from the server, and the number of sets matches the number of activation factors. Then, the snapshot acquisition portion 51 stores the plurality of snapshots, respectively included in the plurality of downloaded sets, in the flash memory 23. The snapshot acquisition portion 51 outputs a set, of the activation factor and the address information indicating a position in the flash memory 23 of the snapshot stored in the flash memory 23, to the association portion 63. In response to reception of the set of the activation factor and the address information, the association portion 63 produces a snapshot definition record and adds the snapshot definition record to the snapshot definition table stored in the flash memory 23 for storage.

The case where the snapshot definition table shown in FIG. 6 is stored in the flash memory 23 will be described below as an example.

When being activated by the activating CPU 13, the recovery portion 55 reads out a snapshot associated with the activation factor from among one or more snapshots stored in the flash memory 23, and stores the read snapshot in the RAM 21. The recovery portion 55 stores the snapshot in the RAM 21 and then outputs an activation completion signal to the main mode switch portion 53.

Specifically, when receiving the reset signal from the activation CPU 13 after reception of power from the power supply control circuit 17, the recovery portion 55 executes a boot program stored in the flash memory 23. This boot program defines the address information indicating a position in the flash memory 23 of any snapshot among the one or more snapshots stored in the flash memory 23. The address information of the snapshot defined by the boot program is overwritten by the activating CPU 13. Therefore, the recovery portion 55 reads out a snapshot specified by the address information defined by the boot program from the flash memory 23 and stores the flash memory in the RAM 21. Thus, the snapshot is stored in the RAM 21 as an execution program, so that the CPU 11 can execute the execution program.

The recovery portion 55 stores the snapshot in the RAM 21 and then outputs the activation completion signal to each of the main mode switch portion 53 and the additional load portion 57.

In the case where the snapshot, which is loaded into the RAM 21, is not any of all of the programs installed in the MFP 100 and corresponds to the activation factor of an operation of the MFP 100 directly performed by the user, that is, in this case, the case where the snapshot loaded into the RAM 21 corresponds to the activation factor of the activation factor identification information "DOCUMENT PLACEMENT", in response to acceptance of a predetermined operation by the operation panel 190 after the reception of the activation completion signal from the recovery portion 55, the additional load portion 57 loads a remaining program not included in the snapshot stored in the RAM 21 into the RAM 21. Thus, the user can allow the MFP 100 to perform a process based on a program not included in the snapshot.

The predetermined operation is an operation of allowing the MFP 100 to perform a process using a hardware resource that is not activated. For example, the predetermined operation includes an operation of allowing the image forming unit 140 to form an image of the image data acquired when the document is read, an operation of allowing the communication I/F unit 160 to transmit the image data acquired when the document is read, and an operation of allowing the facsimile unit 170 to transmit the image data acquired when the document is read.

Figure 13:
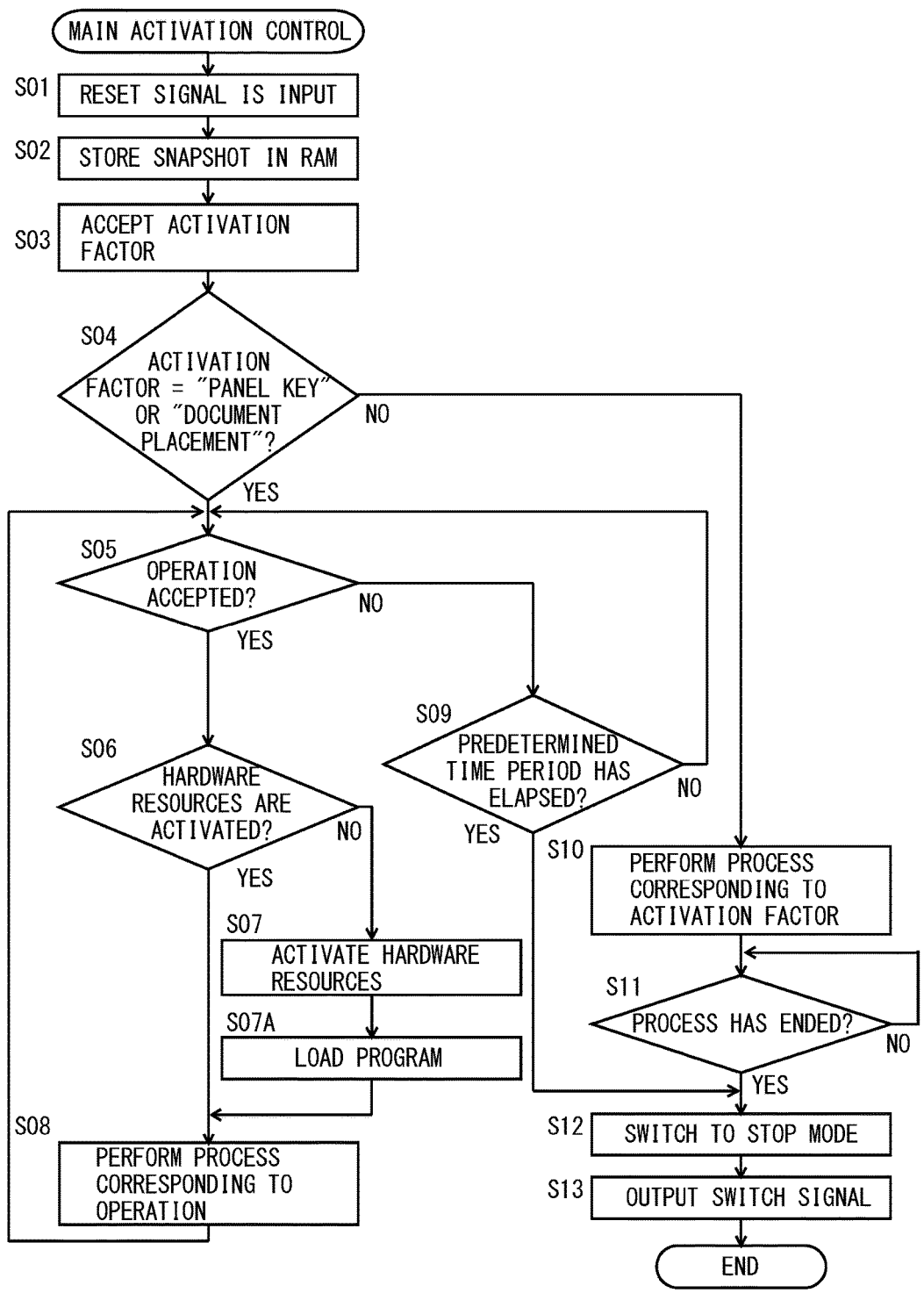
FIG. 13 is a flow chart showing one example of a flow of a main activation control process in the modified example.

FIG. 13 is a flow chart showing one example of a flow of a main activation control process in the modified example. Referring to FIG. 13, a difference of the main activation control process in the modified example from the main activation control process shown in FIG. 9 is that the step S07A is added to follow the step S07. Other processes are the same as the main activation control process shown in FIG. 9. A description therefore will not be repeated. In the step S07A, the main CPU 11 reads out a program not included in the snapshot stored in the RAM 21 from the flash memory 23 and loads the program into the RAM 21, and the process proceeds to the step S08. Thus, the main CPU 11 can control the hardware resources to which power is supplied in the step S07, thereby being capable of performing a process corresponding to the operation accepted in the step S05.

In the case where the activation factor is any of the pieces of activation factor identification information "DOCUMENT PLACEMENT", "FACSIMILE INCOMING CALL" and "DATA RECEPTION", the MFP 100 in the modified example expands snapshots including not all but part of the programs installed in the MFP 100 into the RAM 21. The snapshots of part of the programs installed in the MFP 100 have a smaller data amount as compared to the snapshots of all of the programs installed in the MFP 100. Therefore, in the case where the activation factor is any of the pieces of activation factor identification information "DOCUMENT PLACEMENT", "FACSIMILE INCOMING CALL" and "DATA RECEPTION", the time required for expanding the snapshots from the flash memory 23 into the RAM 21 can be minimized.

Further, the main CPU 11 performs a process based on the activation factor and then loads remaining one or more programs not included in the snapshots stored in the RAM 21 among the plurality of programs into the RAM 21. Therefore, after performing the process based on the activation factor, the main CPU 11 can perform a process other than the process based on the activation factor.

As described above, the MFP 100 in the present embodiment functions as the image forming apparatus and stores snapshots, which are the data stored in the RAM 21 with power supplied to one or more hardware resources associated with the activation factor, in the flash memory 23 for each of the plurality of activation factors. In response to detection of any of the plurality of activation factors during a time period in which power is not supplied to the main CPU 11 and the RAM 21, the activating CPU 11 activates the main CPU 11. In response to switching of the operation mode to the stop mode by the main CPU 11, the activating CPU 13 shuts off the power supply to the main CPU 11 and the RAM 21. Therefore, it is possible to reduce the power consumption by preventing power from being consumed by the main CPU 11 and the RAM 21.

Further, one or more of the plurality of hardware resources is/are associated with each of the plurality of activation factors. In response to detection of any of the plurality of activation factors, power is supplied to one or more hardware resources associated with the activation factor among the plurality of hardware resources, and the main CPU 11 reads out a snapshot associated with the activation factor from the flash memory 23 and stores the snapshot in the RAM 21. Therefore, power is supplied to the one or more hardware resources associated with the activation factor, so that the number of hardware resources to which power is supplied can be minimized, and the power consumption can be reduced.

Further, because the main CPU 11 stores the data stored in the RAM 21 as a snapshot with the one or more hardware resources associated with the activation factor activated, the main CPU 11 can store a snapshot, corresponding to the hardware resources to which power is supplied in the case where the activation factor is detected, in the RAM 21.

Further, in the case where a snapshot is not stored in the flash memory 23, or the case where the snapshot is stored in the flash memory 23 but the activation factor table is changed due to addition of a new hardware resource, the main CPU 11 produces a snapshot. Therefore, in the case where the new hardware resource is added, power consumption during activation can be reduced.

Further, the main CPU 11 expands a snapshot into the RAM 21, and the CPU included in each of the plurality of hardware resources expands a hardware snapshot into the RAM. Therefore, it is not necessary for the main CPU 11 to perform an initialization process for respectively controlling the plurality of hardware resources. Thus, the time period from the time when the main CPU 11 is stopped until the time when the main CPU 11 can perform a process can be minimized.

Further, because the main CPU 11 performs a process defined by the activation factor and then switches the operation mode to the stop mode, the power consumption can be more sufficiently reduced.

Further, in response to a change of a voltage of any of the key terminal of the panel connector 31, the switch terminal of the ADF connector 32, the incoming call notification terminal of the FAX connector 33 and the reception notification terminal of the communication connector 34 from LOW to HIGH, the activating CPU 13 detects the activation factor. Therefore, the activation factor can be easily detected. Further, the power consumption of the activating CPU 13 can be reduced.

Further, the activating CPU 13 can switch the operation mode to any of the normal mode, and the power saving mode in which power consumption is lower than the power consumption in the normal mode. In response to switching of the operation mode of the main CPU 11 to the stop mode, the activating CPU 13 switches the operation mode to the power saving mode. In the power saving mode, in response to detection of the activation factor, the activating CPU 13 switches the operation mode to the normal mode. Therefore, the power consumption during the time period from the time when the main CPU 11 is stopped until the time when the activation factor is detected can be more sufficiently reduced.

Further, in the MFP 100 in the modified example, a snapshot, which includes an execution program that is produced in the case where one or more programs corresponding to the activation factor among the plurality of programs executable by the main CPU 11 is/are loaded into the RAM 21, is stored in the flash memory 23 for each of the plurality of activation factors. Therefore, the size of the snapshot can be reduced, and the time required for expanding the snapshot into the RAM 21 is reduced. Thus, a time period from the time when the main CPU 11 is stopped until the time when the main CPU 11 can perform a process can be reduced.

Further, the main CPU 11 performs a process based on the activation factor and then loads remaining one or more programs, which is/are not loaded into the RAM 21, into the RAM 21, thereby being capable of performing a process other than the process based on the activation factor.

FIG. 14 is a diagram showing one example of the changed activation factor table in the modified example. The activation factor table shown in FIG. 14 is the activation factor table in the modified example shown in FIG. 12 in the case where the activation factor table is changed due to addition of a hardware resource of the finisher.

While the MFP 100 has been described as one example of the image forming apparatus in the above-mentioned embodiment, the present invention may of course be identified as an activation control method for allowing the main CPU 11 to execute the main activation control process shown in FIG. 9 or 13 and allowing the activating CPU 13 to execute the sub-activation control process shown in FIG. 10, and as the activation control program for allowing the main CPU 11 to execute the main activation control process shown in FIG. 9 or 13 and allowing the activating CPU 13 to execute the sub-activation control process shown in FIG. 10.

Although the present invention has been described and illustrated in detail, it is clearly understood that the same is by way of illustration and example only and is not to be taken by way of limitation, the spirit and scope of the present invention being limited only by the terms of the appended claims.

APPENDIX NOTES (1) The image forming apparatus according to any one of claims 1 to 4, wherein the power recoverer supplies power to the main controller and the first storage before the main controller is activated by the activator.

(2) The image forming apparatus according to claim 5, wherein the power recoverer supplies power to the one or more hardware resources before the one or more hardware resources is/are activated by the activator.

What is claimed is:

1. An image forming apparatus comprising:
   a main CPU that executes an activation control program;
   a RAM that stores an execution program loaded for execution of the activation control program by the main CPU;
   an activating CPU that activates the main CPU;
   a flash memory that is accessible by the main CPU and the activating CPU; and
   an activation factor table that associates one or more of a plurality of hardware resources controlled by the main CPU with each of a plurality of activation factors;
   wherein the activation control program, when executed by the main CPU, causes the image forming apparatus to at least:
      switch an operation mode from a driving mode in which power is supplied to a stop mode in which power is not supplied;
      activate, by the activating CPU, a power supply control portion that, in response to switching of the operation mode to the stop mode shuts off power supply to the main CPU, the RAM and the plurality of hardware resources;
      detect, by the activating CPU, any of the plurality of activation factors during a period in which power is not supplied to the main CPU; and
      execute, by the activating CPU, a power supply control circuit that, in response to detection of any of the plurality of activation factors, supplies power to the main CPU, the RAM and one or more hardware resources associated with the detected activation factor among the plurality of hardware resources;
   wherein the activating CPU, in response to detection of any of the plurality of activation factors, activates the main CPU;
   wherein the flash memory, for each of the plurality of activation factors, stores a snapshot, which is data stored in the RAM with power supplied to one or more hardware resources associated with the activation factor by the activation factor table; and
   wherein the main CPU, in response to activation by the activating CPU, reads out a snapshot corresponding to the detected activation factor from among a plurality of snapshots stored in the flash memory from the flash memory, and stores the snapshot in the RAM.

2. The image forming apparatus according to claim 1, wherein
   the main CPU further includes a snapshot acquisition portion that, in response to detection of a state where only one or more hardware resources associated with the activation factor among the plurality of hardware resources are activated, stores data, which is stored in the RAM, in the flash memory as a snapshot for each of the plurality of activation factors.

3. The image forming apparatus according to claim 2, wherein
   the activation factor table, in the case where a new hardware resource is added, associates the added new hardware resource with at least one of the plurality of activation factors, and
   the snapshot acquisition portion, after the new hardware resource is associated with at least one of the plurality of activation factors by the activation factor table, in response to detection of a state where only one or more hardware resources associated with the activation factor among the plurality of hardware resources are activated, stores data, which is stored in the RAM, in the flash memory as a snapshot for each of the plurality of activation factors.

4. The image forming apparatus according to claim 1, wherein
the activating CPU further includes a notification portion that notifies the main CPU of address information indicating a position at which a snapshot corresponding to the detected activation factor is stored in the flash memory, and
the main CPU reads out a snapshot stored at a position specified by address information notified from the activating CPU of the flash memory and stores the snapshot in the RAM.

5. The image forming apparatus according to claim 1, wherein
each of the plurality of hardware resources further includes
a hardware controller,
a hardware RAM, and
a hardware flash memory,
in each of the plurality of hardware resources, the hardware RAM stores an execution program loaded for execution of the program by the hardware controller,
the hardware flash memory, with the hardware controller activated, stores data stored in the hardware RAM as a hardware snapshot,
the activating CPU, in response to detection of any of the plurality of activation factors, further activates one or more hardware resources associated with the detected activation factor among the plurality of hardware resources, and
in each of the plurality of hardware resources, the hardware controller, in response to activation by the activating CPU, reads out the hardware snapshot stored in the hardware flash memory from the hardware flash memory and stores the hardware snapshot in the hardware RAM.

6. The image forming apparatus according to claim 1, wherein
after a process defined by the detected activation factor is performed, the main CPU switches an operation mode to a stop mode.

7. The image forming apparatus according to claim 1, wherein
the flash memory, for each of the plurality of activation factors, stores a snapshot including the execution program loaded into the RAM for execution of one or more programs corresponding to the activation factor among a plurality of programs that are executable by the main CPU.

8. The image forming apparatus according to claim 7, wherein
the main CPU further includes an additional loader that, after a process based on the detected activation factor is performed, loads one or more remaining programs not included in the snapshot stored in the RAM among the plurality of programs into the RAM.

9. The image forming apparatus according to claim 1, wherein
the activating CPU further includes a plurality of input terminals respectively corresponding to the plurality of activation factors, and
in response to input of a signal to any of the plurality of input terminals, the activating CPU detects an activation factor corresponding to an input terminal to which the signal is input among the plurality of input terminals.

10. The image forming apparatus according to claim 1, wherein
the activating CPU further switches an operation mode to any of a normal mode, and a power saving mode in which power consumption is lower than power consumption in the normal mode, and
in response to switching of the operation mode of the main CPU to the stop mode, the activating CPU switches the operation mode to the power saving mode, and in response to detection of any of the plurality of activation factors in the power saving mode, switches the operation mode to the normal mode.

11. An image forming apparatus for performing an activation control method,
the image forming apparatus comprising:
a main CPU that executes an activation control program;
a RAM that stores an execution program loaded for execution of the activation control program by the main CPU;
an activating CPU that activates the main CPU; and
a flash memory that is accessible by the main CPU and the activating CPU; and
the activation control method allowing
any one of the main CPU and the activating CPU to perform an association step of associating one or more of a plurality of hardware resources controlled by the main CPU with each of a plurality of activation factors,
the main CPU to perform a mode switching step of switching an operation mode from a driving mode in which power is supplied to a stop mode in which power is not supplied, and
the activating CPU to perform
a shut-off control step of, in response to switching of the operation mode to the stop mode in the mode switching step, shutting off power supply to the main CPU, the RAM and the plurality of hardware resources, and
an activation factor detection step of, during a period in which power is not supplied to the main CPU, detecting any of the plurality of activation factors,
a power recovery step of, in response to detection of any of the plurality of activation factors in the activation factor detection step, supplying power to the main CPU, the RAM and one or more hardware resources associated with the detected activation factor among the plurality of hardware resources, and
an activation step of, in response to detection of any of the plurality of activation factors in the activation factor detection step, activating the main CPU, wherein
the flash memory, for each of the plurality of activation factors, stores a snapshot, which is data stored in the RAM with power supplied to the one or more hardware resources associated with the activation factor by an activation factor table, and
the activation control method further allows the main CPU to perform a recovery step of, in response to activation in the activation step, reading out a snapshot corresponding to the detected activation factor from among a plurality of snapshots stored in the flash memory from the flash memory and storing the snapshot in the RAM.

12. The activation control method according to claim 11, allowing the main CPU to further perform a snapshot production step of, in response to detection of a state where only one or more hardware resources associated with the activation factor among the plurality of hardware resources are activated, storing data, which is stored in the RAM, in the flash memory as a snapshot for each of the plurality of activation factors.

13. The activation control method according to claim 12, wherein
the association step includes a step of, in the case where a new hardware resource is added, associating the added new hardware resource with at least one of the plurality of activation factors, and
the snapshot production step includes a step of, after the new hardware resource is associated with at least one of the plurality of activation factors in the association step, in response to detection of a state where only one or more hardware resources associated with the activation factor among the plurality of hardware resources are activated, storing data, which is stored in the RAM, in the flash memory as a snapshot for each of the plurality of activation factors.

14. The activation control method according to claim 11, wherein
the activation step further includes a notification step of notifying the main CPU of address information indicating a position at which a snapshot corresponding to the detected activation factor is stored in the flash memory, and
the recovering step includes a step of reading out a snapshot stored at a position specified by address information notified from the activating CPU of the flash memory and storing the snapshot in the RAM.

15. The activation control method according to claim 11, wherein
each of the plurality of hardware resources further includes
a hardware controller,
a hardware RAM, and
a hardware flash memory,
in each of the plurality of hardware resources, the hardware RAM stores an execution program loaded for execution of the program by the hardware controller,
the hardware flash memory, with the hardware controller activated, stores data stored in the hardware RAM as a hardware snapshot,
the activation step includes a step of, in response to detection of any of the plurality of activation factors in the activation factor detection step, activating one or more hardware resources associated with the detected activation factor among the plurality of hardware resources, and
in each of the plurality of hardware resources, the hardware controller, in response to activation by the activating CPU, reads out the hardware snapshot stored in the hardware flash memory from the hardware flash memory and stores the hardware snapshot in the hardware RAM.

16. The activation control method according to claim 11, wherein
after a process defined by the detected activation factor is performed, switching the main CPU switches an operation mode to a stop mode.

17. The activation control method according to claim 11, wherein
the flash memory, for each of the plurality of activation factors, stores a snapshot including the execution program loaded into the RAM for execution of one or more programs corresponding to the activation factor among a plurality of programs that are executable by the main CPU.

18. The activation control method according to claim 17, allowing the main CPU to further perform an additional loading step of, after a process based on the detected activation factor is performed, loading one or more remaining programs not included in the snapshot stored in the RAM among the plurality of programs into the RAM.

19. The activation control method according to claim 11, wherein
the activating CPU further includes a plurality of input terminals respectively corresponding to the plurality of activation factors, and
the activation factor detection step includes a step of, in response to input of a signal to any of the plurality of input terminals, detecting an activation factor corresponding to an input terminal to which the signal is input among the plurality of input terminals.

20. The activation control method according to claim 11, allowing the activating CPU to further perform a sub-mode switching step of switching an operation mode to any of a normal mode, and a power saving mode in which power consumption is lower than power consumption in the normal mode, wherein
the sub-mode switching step includes a step of, in response to switching of the operation mode of the main CPU to the stop mode, switching the operation mode to the power saving mode, and in response to detection of any of the plurality of activation factors in the activation factor detection step in the power saving mode, switching the operation mode to the normal mode.

21. An image forming apparatus that includes a non-transitory computer-readable recording medium encoded with an activation control program executed by an image forming apparatus,
the image forming apparatus comprising:
a main CPU that executes an activation control program;
a RAM that stores an execution program loaded for execution of the activation control program by the main CPU;
an activating CPU that activates the main CPU; and
a flash memory that is accessible by the main CPU and the activating CPU; and
the activation control program allowing
any one of the main CPU and the activating CPU to perform an association step of associating one or more of a plurality of hardware resources controlled by the main CPU with each of a plurality of activation factors,
the main CPU to perform a mode switching step of switching an operation mode from a driving mode in which power is supplied to a stop mode in which power is not supplied, and
the activating CPU to perform
a shut-off control step of, in response to switching of the operation mode to the stop mode in the mode switching step, shutting off power supply to the main CPU, the RAM and the plurality of hardware resources, and an activation factor detection step of, during a period in which power is not supplied to the main CPU, detecting any of the plurality of activation factors, a power recovery step of, in response to detection of any of the plurality of activation factors in the activation factor detection step, supplying power to the main CPU, the RAM and one or more hardware resources associated with the detected activation factor among the plurality of hardware resources, and an activation step of, in response to detection of any of the plurality of activation factors in the activation factor detection step, activating the main CPU, wherein the flash memory, for each of the plurality of activation factors, stores a snapshot, which is data stored in the RAM with power supplied to the one or more hardware resources associated with the activation factor by an activation factor table, and the activation control program further allows the main CPU to perform a recovery step of, in response to activation in the activation step, reading out a snapshot corresponding to the detected activation factor from among a plurality of snapshots stored in the flash memory from the flash memory, and storing the snapshot in the RAM.

\* \* \* \* \*